US006424601B1

United States Patent
Oonuki et al.

(10) Patent No.: US 6,424,601 B1
(45) Date of Patent: Jul. 23, 2002

(54) MAGNETO-OPTICAL RECORDING MEDIA HAVING AN AUXILIARY MAGNETIC LAYER

(75) Inventors: Satoru Oonuki, Toride; Masafumi Yoshihiro, Kitasouma-gun; Nobuyuki Nagai, Tsukuba-gun; Katsusuke Shimazaki, Kitasouma-gun; Hiroyuki Awano, Noda; Hiroshi Shirai, Kitasouma-gun; Norio Ohta, Tsukuba-gun; Satoshi Sumi, Gifu; Atsushi Yamaguchi, Ogaki, all of (JP)

(73) Assignees: Hitachi Maxell, Ltd.; Sanyo Electric Co., Ltd., both of Osaka (JP)

( * ) Notice: Subject to any disclaimer, the term of this patent is extended or adjusted under 35 U.S.C. 154(b) by 0 days.

(21) Appl. No.: 09/142,747

(22) PCT Filed: Jul. 11, 1997

(86) PCT No.: PCT/JP97/02419

§ 371 (c)(1),
(2), (4) Date: Nov. 16, 1998

(87) PCT Pub. No.: WO98/02877

PCT Pub. Date: Jan. 22, 1998

(30) Foreign Application Priority Data

Jul. 12, 1996 (JP) .............................. 8-182900

(51) Int. Cl.$^7$ .............................................. G11B 11/00
(52) U.S. Cl. .............................. 369/13.08; 428/694 ML
(58) Field of Search .......................... 369/13, 116, 288, 369/275.3, 283, 275.1, 13.01, 13.02, 13.06, 13.07, 13.08, 13.09, 13.1, 13.42, 13.43, 13.47; 428/694 EC, 694 ML, 694 MM

(56) References Cited

U.S. PATENT DOCUMENTS 5,321,672 A * 6/1994 Miyamoto et al. ............. 369/13
5,751,669 A * 5/1998 Shiratori ....................... 369/13
5,790,513 A * 8/1998 Hiroki et al. ............. 369/275.2
5,862,105 A * 1/1999 Nishimura ................... 369/13

FOREIGN PATENT DOCUMENTS

EP  0318925 A2  6/1989

(List continued on next page.)

OTHER PUBLICATIONS

"Super Resolution Readout of a Magneto–Optical Disk with an In–Plane Magnetization Layer" Y. Murakami, et al. 1993, pp. 201–204.

(List continued on next page.)

Primary Examiner—Ali Neyzari
(74) Attorney, Agent, or Firm—Birch, Stewart, Kolasch & Birch, LLP

(57) ABSTRACT

A magneto-optical recording medium 11 has, in order from the laser irradiation side, a second auxiliary magnetic film 4, first auxiliary magnetic film 5, and magneto-optical recording film 6. First and second auxiliary magnetic films 4 and 5 change from in-plane magnetization to perpendicular magnetization when their respective critical temperatures $T_{CR1}$ and $T_{CR2}$ are exceeded. The Curie temperatures $T_{C0}$, $T_{C1}$ and $T_{C2}$ of the magneto-optical recording film and the first and the second auxiliary magnetic films 4, 5 and their critical temperatures $T_{CR1}$ and $T_{CR2}$ satisfy the relationship: room temperature<$T_{CR2}$<$T_{CR1}$<$T_{C0}$, $T_{C1}$,$T_{C2}$. The first auxiliary magnetic layer has a film thickness greater than the thickness of the magnetic wall. In response to irradiation by the reproducing light beam, recording magnetic domain 22 of magneto-optical recording film 6 is transferred, with size reduction, to first auxiliary magnetic film 5 and is then transferred, with magnification, to second auxiliary magnetic film 4. This is ideal for reproduction of a high-density recording medium since an amplified reproduction signal is obtained from magnified magnetic domains 23.

45 Claims, 25 Drawing Sheets

FOREIGN PATENT DOCUMENTS

| | | |
|---|---|---|
| EP | 061957 A1 | 10/1994 |
| EP | 0618572 A2 | 10/1994 |
| JP | 1-143041 A | 6/1989 |
| JP | 2-235234 | 9/1990 |
| JP | 3-203051 | 9/1991 |
| JP | 4-325948 | 11/1992 |
| JP | 6-295479 | 10/1994 |
| JP | 7-37283 | 2/1995 |
| JP | 7-73519 | 3/1995 |
| JP | 807350 A | 1/1996 |
| JP | 8-161788 | 6/1996 |
| JP | 9-81979 | 3/1997 |
| JP | 9-138982 | 5/1997 |
| WO | 9722969 A1 | 6/1997 |

OTHER PUBLICATIONS

Malmhaell R. et al.: "Magnetic Spin Directions In Direct Overwrite Exchange–Coupled MO Disk"; vol. 1663, (1992), pp. 204–213, XP000974779.

* cited by examiner

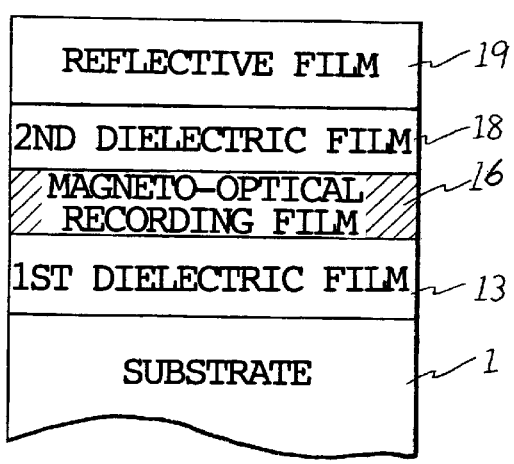
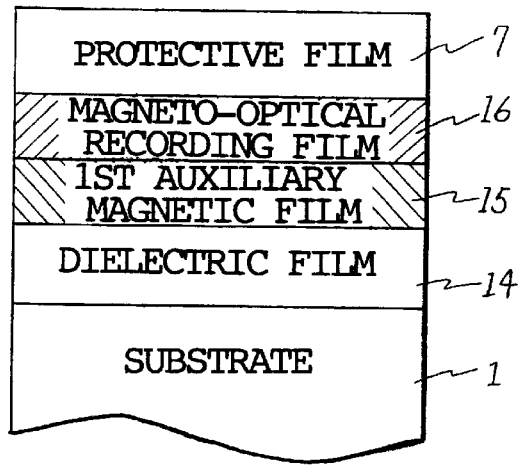
Fig. 5A
Fig. 5B

FIXED SEPARATION $|Hep| < |Hsr|$ $0.15 \leq \dfrac{T_1}{T_1 + T_2} \leq 0.6$

DIRECTION OF DISK ADVANCE

RECORDING MAGNETIC DOMAIN

TRACK

TRACK   RECORDING MAGNETIC DOMAIN

DIRECTION OF DISK ADVANCE

MAGNETO-OPTICAL RECORDING MEDIA HAVING AN AUXILIARY MAGNETIC LAYER

This application is the national phase under 35 U.S.C. §371 of prior PCT International Application No. PCT/JP97/02419 which has an International filing date of Jul. 11, 1997 which designated the United States of America, the entire contents of which are hereby incorporated by reference.

TECHNICAL FIELD

The present invention relates to a magneto-optical recording medium, method for reproducing it and a reproducing apparatus therefor; in more detail it relates to a magneto-optical recording medium, method for reproducing it and a reproducing apparatus therefor suitable for high density recording whereby minute recording magnetic domains smaller than the reproducing light spot can be magnified and reproduced.

BACKGROUND ART

Since in magneto-optical recording media the recorded information can be re-recorded, storage capacity is large and reliability is high, they have started to be implemented as external memories etc. for computers. However, with increases in the amount of information and increased compactness required of the apparatus, further demands are being made on high-density recording and reproducing techniques. To record information on a magneto-optical recording medium, the magnetic field modulation method is employed, wherein a magnetic field of polarity corresponding to the recording signal is applied to a region of the magneto-optical recording medium which has been raised in temperature by directing a laser beam onto it. With this method, over-write recording is possible and furthermore high-density recording with for example a shortest mark length of 0.15 μm can be achieved. Furthermore overwrite recording is possible and has been implemented with an optical modulation recording system in which recording is performed under a constant applied magnetic field, using a light-beam whose power is modulated in accordance with the recording signal.

However, the optical reproduction resolution, which is determined by the spot radius of the reproducing light-beam, presents a problem when recording marks which are recorded at high density are to be reproduced. For example, it is not possible to identify and reproduce minute marks of magnetic domain length 0.2 μm using a reproducing light beam of spot diameter 1 μm. As one approach to eliminating restrictions on reproduction resolution resulting from the optical spot radius of the reproducing light beam, a Magnetically Induced Super Resolution (MSR) technique has been proposed as described in for example Journal of Magnetic Society of Japan, Vol. 17 Supplement No. S1, pp. 201 (1993). In this technique, the effective spot radius that contributes to the reproduction signal is reduced by generating a magnetic mask within the spot by using a temperature distribution generated in the magnetic film within the reproducing light beam spot when the reproducing light beam is directed onto the magneto-optical recording medium. By using this technique, the reproduction resolution can be raised without actually decreasing the spot radius of the reproducing light beam. However, with this technique, the spot radius is effectively reduced by means of the magnetic mask, so the amount of light contributing to the reproduction output is lowered, and so the reproduction C/N is correspondingly lowered. As a result, it is difficult to obtain a satisfactory C/N.

Japanese Patent Laid-Open Publication No. 1-143041 discloses a method of reproducing a magneto-optical recording medium in which reproduction is performed by magnifying the recording magnetic domain of a first magnetic film using a magneto-optical recording medium comprising a first magnetic film, a second magnetic film and a third magnetic film that are mutually magnetically coupled at room temperature and in which, if the Curie temperatures of the first magnetic film, second magnetic film and third magnetic film are assumed to be $T_{C1}$, $T_{C2}$ and $T_{C3}$, then $T_{C2}$>room temperature while $T_{C2}<T_{C1}$ and $T_{C3}$, the coercivity $H_{C1}$ of the first magnetic film being sufficiently small in the vicinity of the Curie temperature $T_{C2}$ of the second magnetic film and the coercivity $H_{C3}$ of the third magnetic film being sufficiently greater than the required magnetic field in the temperature range from room temperature up to a required temperature $T_{PB}$ higher than $T_{C2}$. In this method, utilising the rise in temperature of the medium on illumination by the reproducing light beam, magnetic coupling of the first and third magnetic films is cut off and in this condition the magnetic domain of the first magnetic film is magnified by a demagnetising field acting on the recording magnetic domain and an externally applied magnetic field. It should be noted that, in this method, a second magnetic film is employed whose Curie temperature is set lower than the temperature of the reproduction portion during reproduction, but in the present invention a magnetic film having such a magnetic characteristic is not employed.

Japanese Patent Laid-Open Publication No. 6-295479 discloses a magneto-optical recording medium having a first magnetic layer in which magnetization direction changes from an in-plane direction to a perpendicular direction at a certain transition temperature above room temperature and a second magnetic layer (recording layer) consisting of perpendicularly magnetizable film. The transition temperature of the first magnetic layer becomes higher in the film thickness direction from the side where the light enters, either continuously or stepwise. The first magnetic layer of this magneto-optical recording medium is constituted by a reproducing layer, a first intermediate layer and a second intermediate layer; the temperatures at which the transition takes place from in-plane magnetization to perpendicular magnetization are set to be higher in the order: reproducing layer, first intermediate layer and second intermediate layer, so on information reproduction, due to the relationship of the transition temperatures of the respective layers and the temperature distribution within the reproducing light beam spot, the magnetic domain of the recording layer is magnified and is transferred to the reproducing layer. However, in this publication, there is no detailed description regarding the thickness of the intermediate layers; the total film thickness of the intermediate layers of the magneto-optical recording medium used in an embodiment is 10 nm.

An object of the present invention is to provide a magneto-optical recording medium and a signal reproducing method and reproducing apparatus therefor whereby a reproduction signal with satisfactory C/N can be obtained even when minute magnetic domains are recorded.

DISCLOSURE OF THE INVENTION

According to a first aspect of the present invention, there is provided a magneto-optical recording medium comprising, at least a magneto-optical recording layer on which information is recorded, a first auxiliary magnetic layer and a second auxiliary magnetic layer in which, when irradiated with a reproducing light beam, a recording magnetic domain recorded in the magneto-optical recording layer is magnified and transferred (transmitted) to the second auxiliary magnetic layer through the first auxiliary magnetic layer and information is reproduced from this magnetic domain of the second auxiliary magnetic layer which has thus been magnified and transferred, characterized in that, the thickness of the first auxiliary magnetic layer is not less than the thickness of the magnetic wall of this first auxiliary magnetic layer.

According to a second aspect of the present invention, there is provided a magneto-optical recording medium comprising at least a magneto-optical recording layer on which information is recorded, a first auxiliary magnetic layer and a second auxiliary magnetic layer wherein, when irradiated with a reproducing light beam, a recording magnetic domain recorded in the magneto-optical recording layer is magnified and transferred to the second auxiliary magnetic layer through the first auxiliary magnetic layer and information is reproduced from this magnetic domain of the second auxiliary magnetic layer which has thus been magnified and transferred, characterized in that, the thickness of the first auxiliary magnetic layer exceeds 10 nm.

An example of major parts of a magneto-optical recording medium according to the present invention is illustrated diagrammatically in FIGS. 2A and 2B. The magneto-optical recording medium has a construction in which a first auxiliary magnetic layer (film) 5 and a second auxiliary magnetic layer (film) 4 are successively provided on a magneto-optical recording layer (film) 6. As shown in FIG. 3, first auxiliary magnetic layer 5 and second auxiliary magnetic layer 4 have a magnetic characteristic such that they constitute in-plane magnetized layers from room temperature up to a certain temperature (critical temperature) $T_{CR}$ above room temperature, but constitute perpendicularly magnetizable layers above this $T_{CR}$. Magneto-optical recording layer 6 shows perpendicular magnetization in a wide temperature range including room temperature. Taking the Curie temperatures of magneto-optical recording layer 6, first auxiliary magnetic layer 5 and second auxiliary magnetic layer 4 as being $T_{C0}, T_{C1}$ and $T_{C2}$, and the critical temperatures of the first auxiliary magnetic layer and second auxiliary magnetic layer as being $T_{CR1}$ and $T_{CR2}$, the magnetic characteristics in this magneto-optical recording medium satisfy the relationships: room temperature$<T_{CR2}<T_{CR1}<T_{C0}, T_{C1}, T_{C2}$.

The principle of reproduction of a magneto-optical recording medium having the construction shown in FIGS. 2A and 2B will now be described. FIG. 2A shows the magnetization state of the respective layers prior to reproduction; it is assumed that recording magnetic domain 22 in magneto-optical recording layer 6 has been previously recorded by a magnetic field modulation system or an optical modulation recording system. When a reproducing light beam of appropriate power such that the maximum temperature attained by the magnetic layer is a desired temperature less than $T_{C0}$ is directed onto this magneto-optical recording medium, as shown in FIG. 2B, in regions where the temperature in the first auxiliary magnetic layer 5 is $T_{CR1}$ or more, recorded magnetic domain 22 of magneto-optical recording layer 6 is transferred, producing magnetic domain 21. In this process, as will be described, it is desirable that the transfer (transmission) to first auxiliary magnetic layer 5 should take place in such a way that the size of magnetic domain 21 is less than the size of recording magnetic domain 22 of magneto-optical recording layer 6 i.e. in such a way that recording magnetic domain 22 is reduced. Next, magnetic domain 21 that was transferred to first auxiliary magnetic layer 5 is transferred to second auxiliary magnetic layer 4 to constitute a magnetic domain 23.

The top of FIG. 6 shows the temperature distribution produced when a magneto-optical recording medium of the construction shown in FIG. 2B is heated by a reproduction laser spot (LS); the middle of FIG. 6 shows the temperature distribution of the magneto-optical recording medium with respect to the laser spot (LS) seen from above the second auxiliary magnetic layer. In this magneto-optical recording medium, the critical temperatures of the first and second auxiliary magnetic layers are set such that $T_{CR2}<T_{CR1}$, so the temperature region in which $T_{CR2}$ is exceeded i.e. the region of the second auxiliary magnetic layer in which a perpendicular magnetization state can be obtained, is larger than the temperature region in which $T_{CR1}$ is exceeded i.e. the region of the first auxiliary magnetic layer in which a perpendicular magnetization state can be obtained. Consequently, magnetic domain 23 which is transferred into second auxiliary magnetic layer 4 is magnified, compared with the size of magnetic domain 21, due to the exchange coupling force from the transfer magnetic domain of first auxiliary magnetic layer 5 and the perpendicular magnetic anisotropy of the second auxiliary magnetic layer. Since this magnified magnetic domain 23 is larger than the recording magnetic domain 22 of magneto-optical recording layer 6 the reproduction signal that is detected by means of the magneto-optical effect (Kerr effect) is amplified from that which would have been detected from a magnetic domain of the same size as recording magnetic domain 22, making possible reproduction with high C/N. That is, although in reproduction using ordinary Magnetically Induced Super Resolution, the reproduction signal amplitude from the minute magnetic domains is very small, by using the present magneto-optical recording medium, even though a signal is reproduced from a minute magnetic domain, an amplified reproduction signal amplitude can be obtained.

In a magneto-optical recording medium according to the present invention, it is desirable that the size of a magnetic domain 21 that is transferred into first auxiliary magnetic layer 5 should be smaller than that of recording magnetic domain 22 of magneto-optical recording layer 6. That is, when recording magnetic domain 22 of magneto-optical recording layer 6 is transferred as magnetic domain 21 of first auxiliary magnetic layer 5, it is desirable that the magnetic domain should be reduced. The reasons for this will now be described.

If the size of the magnetic domain 21 (magnetized in the ↑ direction) that is transferred to first auxiliary magnetic layer 5 is the same as or greater than the size of magnetic domain 22, magnetic domain 21 is magnetically affected by magnetic domain S having magnetization in the ↓ direction and adjoining recording magnetic domain 22, with the result that magnetic domain 21 becomes unstable. Since magnetic domain 21 that is transferred to first auxiliary magnetic layer 5 is required to have the function of transferring the magnetization information of recording magnetic domain 22 to second auxiliary magnetic layer 4 having the function of magnifying the magnetic domain, it has to be magnetically stable. Consequently, by effecting transfer from a recording magnetic domain 22 to first auxiliary magnetic layer 5 with the magnetic domain being reduced in size, the effect from magnetic domain S adjoining recording magnetic domain 22 on magnetic domain 21 of first auxiliary magnetic layer 5 can be reduced, enabling the magnetization of magnetic domain 21 of first auxiliary magnetic layer 5 to be stabilised. In particular, since the magneto-optical recording medium is usually reproduced while rotating, the magnetic domains of magneto-optical recording layer 6 move successively past the reproducing light beam spot whilst the magneto-optical recording medium is being rotated as shown in FIGS. 29A and B. Furthermore, the temperature region of first auxiliary magnetic layer 5 exceeding $T_{CR1}$ exists at a fixed position with respect to the reproducing light beam spot. If the temperature region of first auxiliary magnetic layer 5 exceeding $T_{CR1}$ is of the same size as recording magnetic domain 22, the time for which only one recording magnetic domain 21 is in this temperature region during movement is only an instant; the rest of the time, in this temperature region there will be found part of one recording magnetic domain 21 and part of an in-plane magnetized recording magnetic domain adjacent to it. It is therefore very difficult to reproduce from the temperature region of first auxiliary magnetic layer 5 exceeding $T_{CR1}$ magnetic information of a single recording magnetic domain only. However, if the temperature region of first auxiliary magnetic layer 5 in which $T_{CR1}$ is exceeded is smaller than the size of recording magnetic domain 22, the time for which this temperature region is over only a single recording magnetic domain becomes comparatively long. At both the instant shown in FIG. 29A and the instant shown in FIG. 29B, magnetic domain 21 resulting from the transfer of magnetization of recording magnetic domain 22 due to $T_{CR1}$ being exceeded is entirely contained in the region above recording magnetic domain 22. As a result, the magnetization can be reliably transferred from recording magnetic domain 22 to first auxiliary magnetic layer 5. The above reason applies even in the case of a perpendicularly magnetizable film wherein the first auxiliary magnetic layer 5 is at room temperature or above. That is, it is beneficial to arrange for transfer to be effected such that the magnetic domain that is transferred to the first auxiliary magnetic layer from the magneto-optical recording layer is reduced in size, even when a magnetic material that shows perpendicular magnetization at room temperature or above is employed as the first auxiliary magnetic layer.

Making the size of magnetic domain 21 that is transferred to first auxiliary magnetic layer 5 smaller than that of recording magnetic domain 22 of magneto-optical recording layer 6 is also beneficial for the following reason. A recording magnetic domain S having ↓ directed magnetization is present adjacent recording magnetic domain 22 having ↑ directed magnetization. However, since first auxiliary magnetic layer 5 has in-plane magnetization within the range indicated by region W of FIG. 6, the exchange coupling force from the ↓ directed magnetic domain S of magneto-optical recording layer 6 extending to second auxiliary magnetic layer 4 is cut off by this in-plane magnetization. Consequently the in-plane magnetization of first auxiliary magnetic layer 5 effectively acts to magnify magnetic domain 23. Thus, if the size of the magnetic domain of first auxiliary magnetic layer 5 is smaller than the size of recording magnetic domain 22, the effect of this in-plane magnetization of first auxiliary magnetic layer 5 in cutting of f the exchange coupling force from the ↓ directed magnetic domain S of magneto-optical recording layer 6 extending to second auxiliary magnetic layer 4 is further increased, thereby further facilitating the magnification of magnetic domain 22 (↑ directed magnetization).

In order to make the size of the magnetic domain of first auxiliary magnetic layer 5 smaller than the size of recording magnetic domain 22, as shown in FIG. 6, the laser power and $T_{CR1}$ of first auxiliary magnetic layer 5 may be adjusted such that the temperature region where the $T_{CR1}$ of first auxiliary magnetic layer 5 is exceeded is smaller than the size (width) of recording magnetic domain 22 of magneto-optical recording layer 6. In the example shown in FIG. 6, furthermore, the laser power and $T_{CR2}$ of second auxiliary magnetic layer 4 are adjusted such that the temperature region where the $T_{CR2}$ of second auxiliary magnetic layer 4 is exceeded is larger than the size (width) of recording magnetic domain 22. Consequently, on reproduction, recording magnetic domain 22 of magneto-optical recording layer 6 is transferred as magnetic domain 21 of first auxiliary magnetic layer 5 with its size reduced and furthermore magnetic domain 21 is transferred to second auxiliary magnetic layer 4 as magnetic domain 23 with its size increased.

It should be noted that the fact that the size of the magnetic domain 21 that is transferred to first auxiliary magnetic layer 5 is smaller than the size of recording magnetic domain 22 of magneto-optical recording layer 6 can be verified for example by the following method: substrate 1 is removed from a magneto-optical recording medium shown in FIG. 1 on which information has been recorded and dielectric layer (film) 3 and secondary auxiliary magnetic layer 4 are removed by for example sputtering; the surface of the first auxiliary magnetic layer is then heated to reproduction temperature and examined using an optical microscope etc.

The benefit in terms of reproduction signal amplification which is obtained by magnification of magnetic domain 23 of second auxiliary magnetic layer 4 is a maximum when the transferred magnetic domain in second auxiliary magnetic layer 4 is magnified to the diameter of the reproducing light beam spot. In this condition the magnitude of the reproduction signal depends on the figure of merit such as of the Kerr effect of the second auxiliary magnetic layer 4 and the reproducing light beam, irrespective of the size or configuration of recording magnetic domain 22 of magneto-optical recording layer 6. After the region of the magneto-optical recording medium from which the information has been reproduced has moved past the spot of the reproducing laser beam, its temperature falls to less than $T_{CR2}$, with the result that the perpendicular magnetization of the first and second auxiliary magnetic layers returns to in-plane magnetization i.e. the state of FIG. 2A is again produced. During the reproduction action as described above, the reproducing laser beam power is adjusted such that the maximum temperature reached by the magneto-optical recording medium is lower than the Curie temperature $T_{C0}$ of magneto-optical recording layer 6, so the magnetic information recorded in magneto-optical recording layer 6 is not affected by the reproducing light beam.

With the first aspect of the present invention, the thickness of the first auxiliary magnetic layer must be equal to or more than the thickness of the magnetic wall of the first auxiliary magnetic layer. As shown in FIGS. 2A, B and FIG. 6, when the critical temperature $T_{CR1}$ is exceeded, the magnetization of the first auxiliary magnetic layer 5 makes a transition from in-plane magnetization to perpendicular magnetization. In order to make this transition possible, the magnetic spin in the magnetic wall between magnetic domain 21 of first auxiliary magnetic layer 5 and the in-plane magnetized magnetic domain of first auxiliary magnetic layer 5 adjacent magnetic domain 21 (hereinbelow referred to as the magnetic wall of the first auxiliary magnetic layer) must be twisted through 90°. Furthermore it is necessary that in region W only the first magnetic layer should consist of in-plane magnetizable magnetic film, buffering the spin of the magneto-optical recording layer 6 and second auxiliary magnetic layer. Consequently, in order to allow the transition between in-plane magnetization and perpendicular magnetization in first auxiliary magnetic layer 5, the thickness of the first auxiliary magnetic layer must be, at the very least, greater than the thickness of the magnetic wall of first auxiliary magnetic layer 5.

The thickness of the magnetic wall can be measured by for example a process as described below using the Hall effect. First auxiliary magnetic layer 5, second auxiliary magnetic layer 4 and magneto-optical recording film 6 are magnetized in one direction and the Hall voltage ($V_2$) is then measured. Further, if we take the Hall resistance and film thickness of the first auxiliary magnetic layer 5, second auxiliary magnetic layer 4 and magneto-optical recording film 6 as being respectively $\rho_1$, $\rho_2$, $\rho_3$, and $t_1$, $t_2$ and $t_3$, the Hall voltage ($V_3$) when there is no interface magnetic wall can be found by the following expression: $V_3 = I \times (t_1\rho_1 + t_2\rho_2 + t_3\rho_3)/(t_1+t_2+t_3)^2$ (where, in this expression, I is the current flowing into the film (layer)). Consequently, the difference $V_4$ of the absolute value of the voltage including the interface magnetic wall $|V_1-V_2|$ and $2V_3$ indicates the thickness of the interface wall.

The magnetic spin state, which indicates the Hall voltage $V_4$, can be estimated using the exchange stiffness constant, the perpendicular magnetically anisotropic energy constant and the saturation magnetization of the respective layers. Such a method of calculating the extent of the interface magnetic wall is set out in R. Malmhall, et al., Proceedings of Optical Data Storage 1993 p204–213: this document may be referenced. In the present invention, it is desirable that the thickness of the first auxiliary magnetic layer should be at least equal to the thickness of the magnetic wall measured by the measurement method using the Hall effect described above. For example in the case where the magnetic material of auxiliary magnetic layer 5 is GdFeCo-based, for example $Gd_XFe_YCo_Z$ ($20 \leq X \leq 35$, $50 \leq Y \leq 100$, $0 \leq Z \leq 50$), the thickness of the magnetic wall calculated by the above method of calculation is calculated to be about 50 nm. Consequently, in the case where the first auxiliary magnetic layer is $Gd_XFe_Y$-$Co_Z$ ($20 \leq X \leq 35$, $50 \leq Y \leq 100$, $0 \leq Z \leq 50$), the thickness of the magnetic layer is preferably at least 50 nm.

The magnetic wall thickness as above depends on the type and composition of the magnetic material, but if magnetic material as used in the magnetic layer of the magneto-optical recording medium is employed, in general a minimum thickness of 10 nm is necessary. Consequently, in a second aspect of the present invention, it is desirable that the thickness of the first auxiliary magnetic layer should exceed 10 nm.

As an upper limit on the first auxiliary magnetic layer, it is desirable that its thickness should not be greater than 100 nm, due to limitations on the power of the semiconductor laser which constitutes the light source for reproduction. Consequently, it is desirable that the thickness t of the first auxiliary magnetic layer should be 10<t<100 nm.

According to the third aspect of this invention, there is provided a method of reproducing a magneto-optical recording medium in which a recorded signal is reproduced by irradiating a magneto-optical recording medium having a magneto-optical recording layer with a reproducing light beam and detecting the magnitude of the magneto-optical effect, characterized in that, a magneto-optical recording medium as set out in the first or the second aspects of the present invention is employed as the magneto-optical recording medium and the recording signal is reproduced by irradiating the magneto-optical recording medium with a reproducing light beam which is pulse-modulated in accordance with a reproducing clock.

According to the fourth aspect of this invention, there is provided a method of reproducing a magneto-optical recording medium in which a recorded signal is reproduced by irradiating a magneto-optical recording medium having a magneto-optical recording layer with a reproducing light beam and detecting the magnitude of the magneto-optical effect, characterized in that, magneto-optical recording medium as set out in the first or the second aspect of the present invention is employed as the magneto-optical recording medium and the recording signal is reproduced by applying to the magneto-optical recording medium an external magnetic field which is pulse-modulated in accordance with a reproducing clock.

Further in a method of reproduction according to the present invention, a recorded signal is reproduced by applying to a magneto-optical recording medium an external magnetic field that is pulse-modulated in accordance with a reproduction clock while irradiating it with a reproducing light beam field that is pulse-modulated in accordance with a reproduction clock.

Further in accordance with a fifth aspect of the present invention, there is provided a reproducing apparatus for magneto-optical recording media that is suitable for performing the reproduction method of the third aspect of the present invention. This reproducing apparatus is provided with an optical head that directs a reproducing light beam onto the magneto-optical recording medium; a clock generating unit for generating a reproducing clock; and a control unit for controlling the optical head so as to produce pulse modulation of the reproducing light beam in accordance with the reproducing clock.

In accordance with a sixth aspect of the present invention, there is provided a reproducing apparatus for magneto-optical recording media that is suitable for performing the reproduction method of the fourth aspect of the present invention. This reproducing apparatus comprises: a magnetic head that applies a reproducing magnetic field to the magneto-optical recording medium; an optical head that irradiates the magneto-optical recording medium with a reproducing light beam; a clock generating unit for generating a reproducing clock; and a control unit for controlling at least one of the magnetic head and optical head in accordance with the reproducing clock in order to pulse-modulate at least one of the reproducing magnetic field and the reproducing light beam. The reproducing apparatus of the sixth aspect may further comprise: an optical head drive unit; a first synchronisation signal generating circuit for generating a first synchronisation signal for pulse-modulating the reproducing light beam in accordance with the reproducing clock; a magnetic head drive unit; and a second synchronisation signal generating circuit for generating a second synchronisation signal for pulse-modulating the reproducing magnetic field in accordance with the reproducing clock; the magneto-optical recording medium being irradiated by the reproducing light beam which is pulse-modulated by the optical head drive unit being controlled by the first synchronisation signal and a magnetic field that is pulse-modulated by the magnetic head drive unit being controlled by the second synchronisation signal being applied to the magneto-optical recording medium.

In the reproducing method and reproducing apparatus of the present invention, the reproducing clock can be generated from a signal detected by the optical head (internal clock) or can be generated from a signal detected from pits, fine clock marks or wobble-shaped grooves formed in the magneto-optical recording medium (external clock). Also, in the reproducing apparatus of the present invention, information may be recorded by controlling the optical head and/or the magnetic head.

BRIEF DESCRIPTION OF THE DRAWINGS

FIG. 5A is a cross-sectional view illustrating the stacked structure of a conventional magneto-optical recording medium and FIG. 5B is a cross-sectional view illustrating the stacked structure of a magneto-optical recording medium of the Magnetically Induced Super Resolution type;

FIG. 22A shows the relationship of the period with a magnified or reduced-size magnetic field.

BEST MODE FOR CARRYING OUT THE INVENTION

Specific examples of a magneto-optical recording medium, method for reproducing it and a reproducing apparatus therefor according to the present invention are described in detail below with reference to the appended drawings.

Embodiment 1

Figure 1:
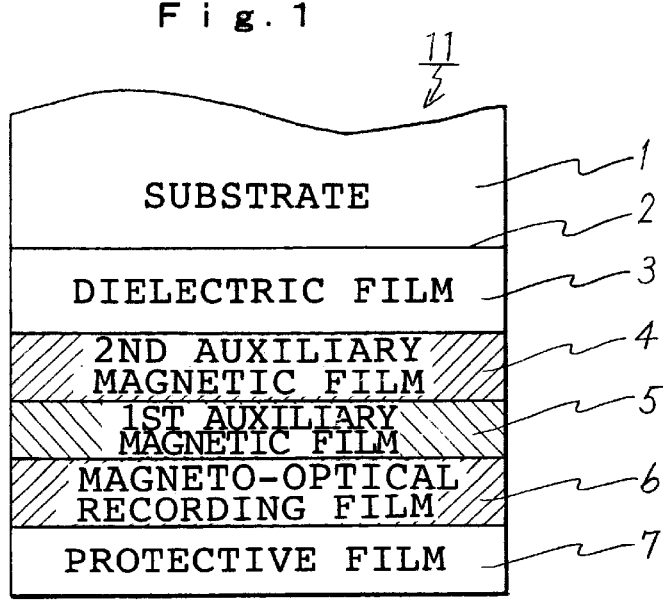
FIG. 1 is a cross-sectional view illustrating diagrammatically the stacked structure of a magneto-optical recording medium according to the present invention.
Figure 2A:
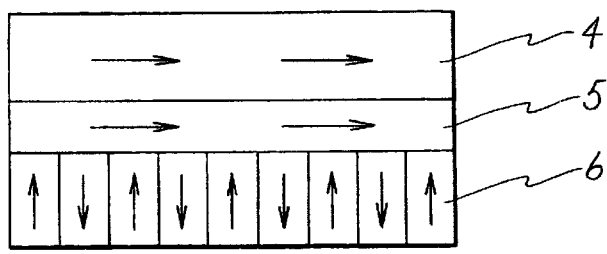
FIG. 2A is a diagram illustrating the magnetization state of the respective layers of a magneto-optical recording medium according to the present invention prior to reproduction and FIG. 2B is a diagram illustrating the magnetization state of the respective layers of the magneto-optical recording medium shown in FIG. 2A on reproduction.
Figure 2B:
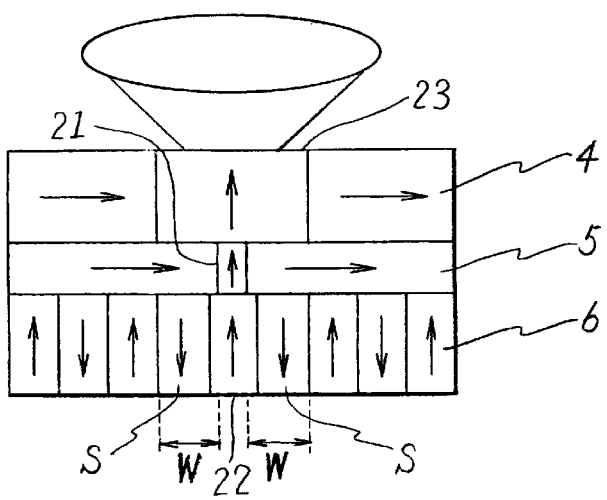

An example of the construction of a magneto-optical recording medium belonging to a first type of the present invention is described below with reference to FIG. 1. As shown in FIG. 1, a magneto-optical recording medium 11 belonging to a first type comprises: a transparent substrate 1 on one face of which a desired preformat pattern 2 is formed and a dielectric film 3 formed on preformat pattern 2; a second auxiliary magnetic film 4 formed on dielectric film 3; a first auxiliary magnetic film 5 formed on second auxiliary magnetic film 4; a magneto-optical recording film 6 formed on first auxiliary magnetic film 5; and a protective film 7 formed on magneto-optical recording film 6.

In the construction shown in FIG. 1, as transparent substrate 1, any desired substrate that has optical transparency may be employed, for example transparent resin materials such as polycarbonates or amorphous polyolefins formed into a desired shape, or substrates wherein a film of transparent resin onto which a desired preformat pattern 2 has been transferred is stuck onto one face of a glass sheet which is formed in a desired shape. Dielectric film 3 is provided in order to increase the apparent Kerr rotation angle by multiple in-film interference of the reproducing light beam, and can be formed by an inorganic dielectric consisting for example of SiN, whose refractive index is larger than that of transparent substrate 1. Protective film 7 serves to protect films 3~6 formed between substrate 1 and protective film 7 from adverse chemical effects such as corrosion and consists for example of SiN film. Magneto-optical recording film 6 is a perpendicularly magnetizable film showing perpendicular magnetic anisotropy in a wide temperature range including room temperature; amorphous alloys of rare earth elements and transition metals such as for example TbFeCo, DyFeCo, or TbDyFeCo are preferable, but other known magneto-optical recording materials such as alternately laminated Pt film and Co film or garnet-type oxide magnetic bodies may be employed.

Figure 3:
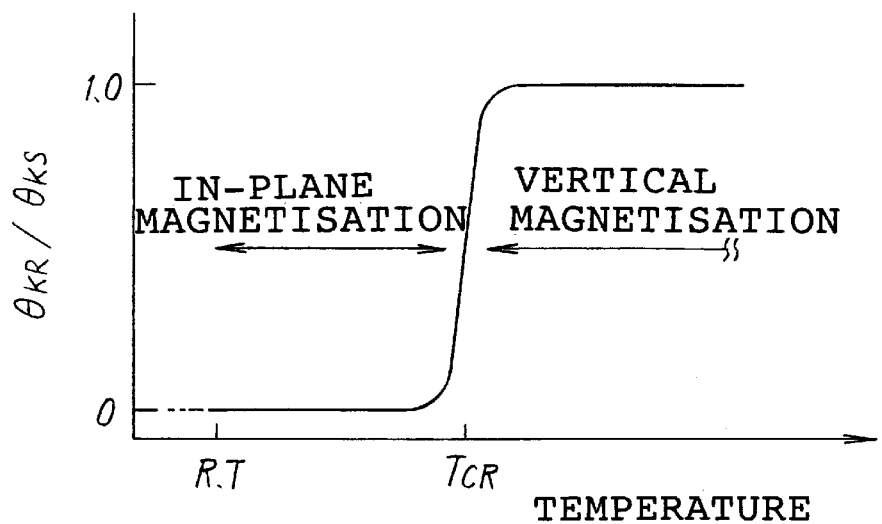
FIG. 3 is a view showing the magnetization characteristic of an auxiliary magnetic layer comprised in a magneto-optical recording medium according to the present invention.

As shown in FIG. 3, first auxiliary magnetic film 5 and second auxiliary magnetic film 4 have magnetic characteristics whereby they are in-plane magnetizable films from room temperature (R.T) up to a certain critical temperature ($T_{CR}$) above room temperature and at or above $T_{CR}$ execute a transition to perpendicularly magnetizable film. In FIG. 3, in order to represent the direction of magnetization, $\theta_{KR}/\theta_{KS}$ (where $\theta_{KR}$ is the residual Kerr rotation angle and $\theta_{KS}$ is the saturated Kerr rotation angle) found from the hysteresis loop of the Kerr effect when an external magnetic field is applied in the direction perpendicular to the film surface of the auxiliary magnetized film is shown with respect to temperature. It should be noted that, in this specification, "room temperature" indicates the atmospheric temperature when the magneto-optical recording medium is used; this will vary somewhat depending on the location of use but is usually 15° C.~25° C. As material of the auxiliary magnetic films 4 and 5, for example amorphous alloys of rare earth elements and transition metals such as for example GdFeCo, GdFe, GdTbFeCo, or GdDyFeCo are preferred. The constituents and composition of the first and second auxiliary magnetic layers are determined taking into account the condition $T_{CR2} < T_{CR1}$ and/or the relationship of the size of the magnetic domain of the magneto-optical recording layer and the temperature region for which $T_{CR1}$ is exceeded under illumination by the reproducing light beam.

Dielectric film 3, second auxiliary magnetic film 4, first auxiliary magnetic film 5, magneto-optical recording film 6 and protective film 7 can be formed for example by dry processing such as continuous sputtering using a magnetron sputtering apparatus.

An example of the manufacture of a sample magneto-optical disk is illustrated below as an example of the magneto-optical recording medium shown in FIG. 1. The sample magneto-optical disk is manufactured using the sputtering method to successively deposit onto a glass substrate having a preformat pattern a dielectric film consisting of SiN film, a second auxiliary magnetic film consisting of $Gd_{25}Fe_{56}Co_{19}$ film (II); a first auxiliary magnetic film consisting of $Gd_{28}Fe_{53}Co_{19}$ film (I); a magneto-optical recording film consisting of $Tb_{21}Fe_{66}Co_{13}$ film; and a protective film consisting of SiN film. Table 1 shows the thickness and magnetic characteristics of the auxiliary magnetic films and magneto-optical recording film used in this case. $T_C$ in the Table indicates the Curie temperature and $T_{CR}$ indicates the critical temperature at which the in-plane magnetization of the auxiliary magnetic film changes to perpendicular magnetization.

TABLE 1

| Material | Film thickness (nm) | $T_C$ (° C.) | $T_{CR}$ (° C.) | |
|---|---|---|---|---|
| Magneto-optical recording film | TbFeCo | 50 | 270 | — |
| First auxiliary magnetic film | GdFeCo (I) | 60 | >300 | 200 |
| Second auxiliary magnetic film | GdFeCo (II) | 50 | >300 | 90 |

A test signal was recorded in the data recording region of the sample disk manufactured as above by modulating an external magnetic field in accordance with the recording signal whilst applying a laser beam for pulses of a fixed period: in other words, the optical magnetic field modulation system was employed. The duty ratio of the recording optical pulses was 50%. Test signals were employed such as to form recording marks of various different recording mark lengths. Next, recording lengths of various lengths were reproduced using an object lens of numerical aperture NA=0.55, an optical pickup of laser wavelength 780 nm, a linear speed of 7.5 m/sec, reproduction power 2.5 mW, and setting the externally applied magnetic field to zero during reproduction. It was found by means of the verification method described above, that by adjusting the composition of the magneto-optical recording film, first auxiliary magnetic film and second auxiliary magnetic film of the sample disk and reproduction power as described above, the size (radius) of the perpendicularly magnetized magnetic domains which were transferred into the first auxiliary magnetic film could be made smaller than the size (radius) of the recording magnetic domains of the magneto-optical recording film.

Figure 4:
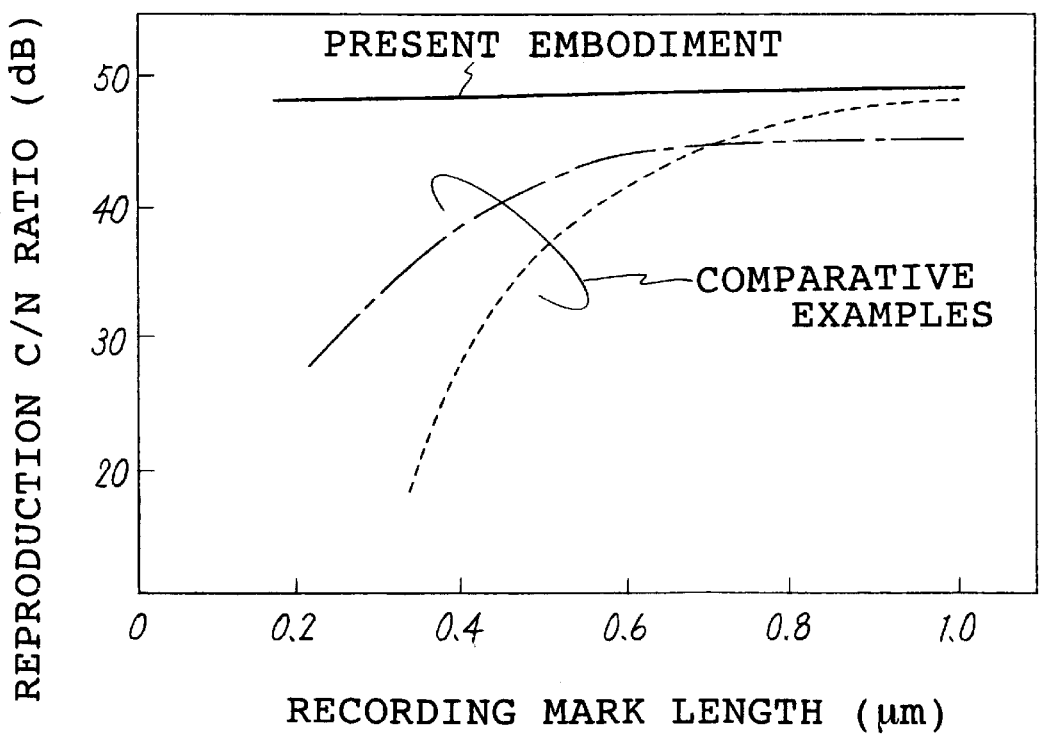
FIG. 4 is a graph showing the relationship between the reproduction C/N and the recording mark length in a prior art magneto-optical recording medium and in a magneto-optical recording medium manufactured in accordance with Embodiment 1 of the present invention.
Figure 6:
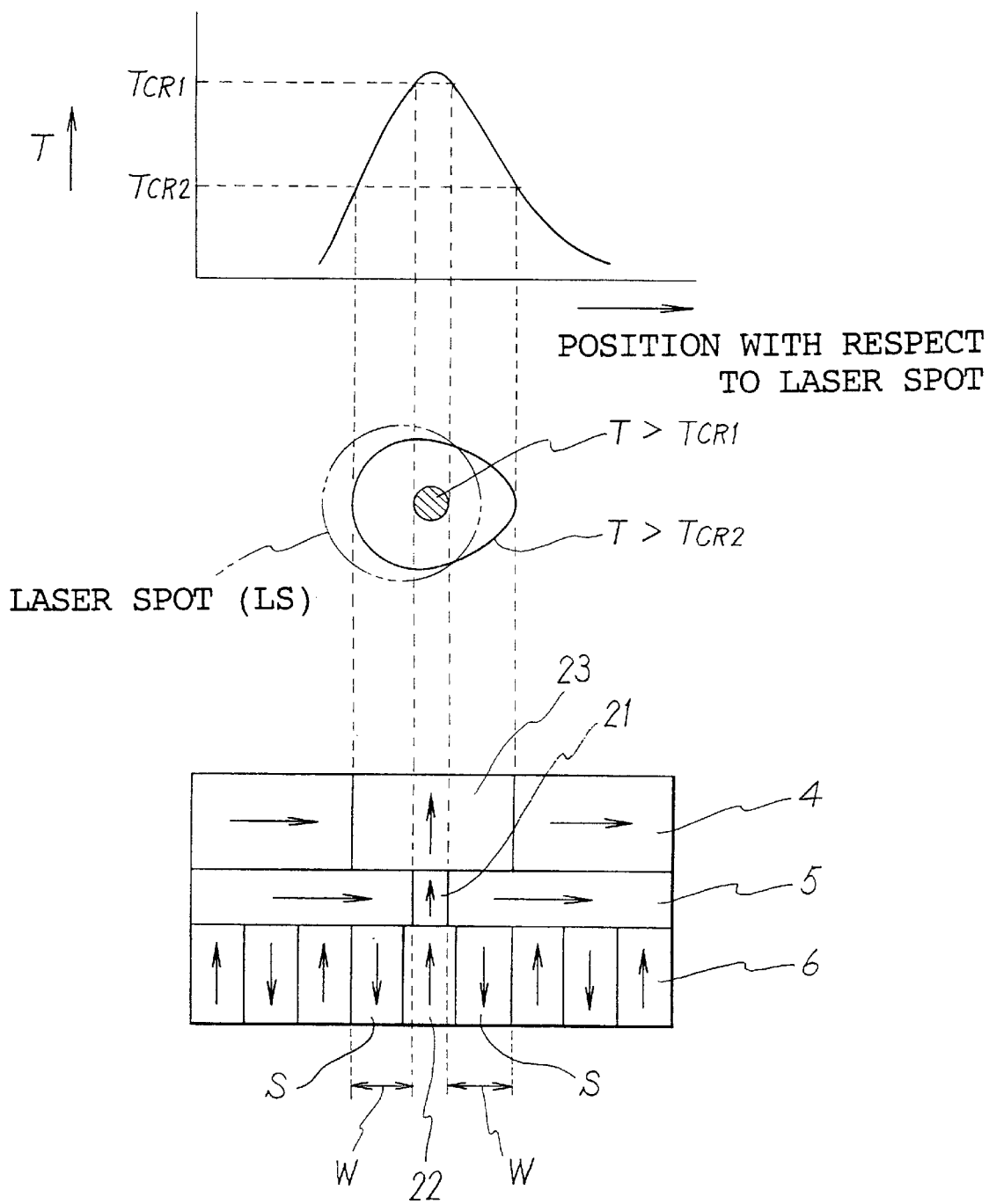
FIG. 6 is a view using temperature distribution to illustrate the principles of reproduction of the magneto-optical recording medium shown in FIG. 2A and FIG. 2B.

FIG. 4 shows the results of measuring the dependence of reproduction CN ratio (C: carrier level, N: noise level) on recording magnetic domain length. FIG. 4 also shows, for comparison, the data of two types of conventional magneto-optical recording media. The dotted-line data are the reproduction data of the conventional magneto-optical recording medium shown in FIG. 5A, TbFeCo being used as a single-layer magneto-optical recording film 16. The single-dotted chain line data are the results of a Magnetically Induced Super Resolution (MSR) disk consisting of a TbFeCo magneto-optical recording film 16 and a two-layer magnetic film of first auxiliary magnetic film 15 of GdFeCo as shown in FIG. 5B. From the results of FIG. 4, it can be seen that, with the sample disk (continuous-line data) according to an embodiment of the present invention, even with recording mark length of 0.2 µm, a much higher reproduction C/N was obtained than with the two conventional disk types. Consequently, by employing the present invention, very fine recording marks, exceeding the conventional reproduction limit, can be reproduced i.e. recording density can be raised.

When the thickness of the magnetic wall of the $Gd_{28}Fe_{53}Co_{19}$ film constituting the first auxiliary magnetic layer used in this embodiment is calculated using the method of calculation described above, it was found to be about 50 nm; bearing in mind that the film thickness of the first auxiliary magnetic layer is 60 nm, this satisfies the condition of the present invention in regard to film thickness of the first auxiliary magnetic layer. Also, the thickness of the magnetization of the first auxiliary magnetic layer wall when measured using the Hall effect is found to be less than 60 nm.

In this embodiment, exchange coupling was produced between the films lying on top of each other by inter-film contact of the three magnetic films: magneto-optical recording film 6, first auxiliary magnetic film 5 and second auxiliary magnetic film 4; however, magnetostatic coupling between the magnetic films could be achieved by inserting a non-magnetic film between magneto-optical recording film 6 and first auxiliary magnetic film 5 or between first auxiliary magnetic film 5 and second auxiliary magnetic film 4, or between both of these.

Also, although in this embodiment, two auxiliary magnetic films 4 and 5 were employed, it would be possible to employ n (n≧3) successive auxiliary magnetic film layers lying on top of each other so long as the $T_{CR}$s (critical temperature at which the film changes from in-plane magnetizable film to perpendicularly magnetizable film) of each layer are set such that $T_{CR1} > T_{CR2} > \ldots > T_{CRn} >$ room temperature (where $T_{CRi}$ is the $T_{cr}$ of the i-th auxiliary magnetic film). Even in this case, the first auxiliary magnetic film is provided on the side of magneto-optical recording film 6 and the n-th auxiliary magnetic film is provided on the side of dielectric film 3.

Also, in order to make the temperature profile of the medium when a reproducing light beam is directed onto it of the desired shape or in order to minimise the linear velocity dependence of the temperature profile, a heat control film of suitable thermal conductivity is provided on protective film 7 of magneto-optical recording medium 11, or between protective film 7 and magneto-optical recording medium 16. Also, although in this embodiment, reproduction was performed using an ordinary DC laser, it would also be possible to obtain an even better C/N ratio by performing reproduction with a pulsed laser beam of frequency corresponding to the shortest mark length, as in Embodiment 2, to be described.

Also, in order to obtain an even better reproduction CN ratio, a reproduction magnetic film which is a perpendicularly magnetizable film whose Kerr rotation angle θK at the maximum temperature attained by the medium when illuminated with a reproducing light beam is equal to or greater than the θK of second auxiliary magnetic film 4 and above room temperature may be added between dielectric film 3 and second auxiliary magnetic film 4. As the material of such a reproduction magnetic film for example GdFeCo may be employed.

Embodiment 2

Figure 7:
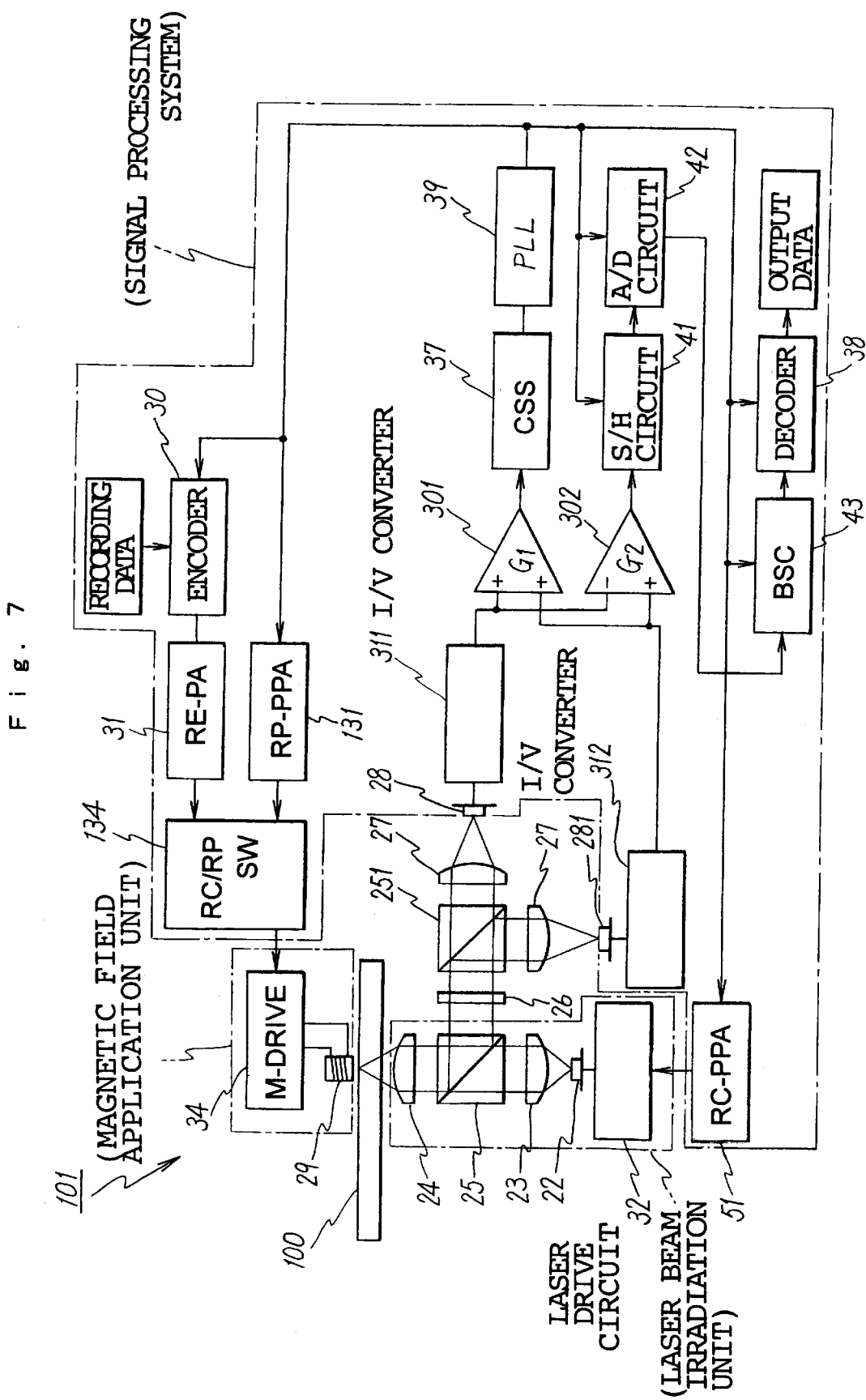
FIG. 7 is a constructional diagram of a magneto-optical recording and reproducing apparatus according to the present invention.

In this embodiment, a construction example is described of an apparatus which records and reproduces a magneto-optical recording medium specifically described in Embodiment 1. Apparatus 101 shown in FIG. 7 is mainly constituted by: a laser beam irradiation unit for directing a beam that is pulsed with a fixed period and is synchronised with code data onto a magneto-optical disk 100 (11); a magnetic field application unit that applies a controlled magnetic field to magneto-optical disk 100 on recording/reproduction; and a signal processing system that detects and processes signals from magneto-optical disk 100. In the laser beam generating unit, laser 22 is connected to a laser drive circuit 32 and recording pulse width/phase adjustment circuit (RC-PPA) 51; laser drive circuit 32 receives a signal from recording pulse width/phase adjustment circuit 51 and controls the laser pulse width and phase of laser 22. Recording pulse width/phase adjustment circuit 51 receives a clock signal, to be described, from a PLL circuit 39 and generates a first synchronisation signal for adjusting the phase and pulse width of the recording beam.

In the magnetic field application unit, a magnetic field coil 29 that applies a magnetic field is connected with a magnetic coil drive circuit (M-DRIVE) 34; during recording, magnetic coil drive circuit 34 receives input data from an encoder 30 to which data is input, through a phase adjustment circuit (RE-PA) 31 and controls magnetic field coil 29. During reproduction, it receives a clock signal, to be described later, from PLL circuit 39, and via a reproducing pulse width/phase adjustment circuit (RP-PPA) of the magnetic field 131 (second synchronisation signal generating circuit) generates a second synchronisation signal for adjusting phase and pulse width and thereby controls magnetic field coil 29. A recording and reproducing changeover switch (RC/RP SW) 134 is connected to magnetic coil drive circuit 34 in order to effect changeover of the signal that is input to magnetic coil drive circuit 34 on recording and reproduction.

In the signal processing system, a first deflecting prism 25 is arranged between laser 22 and magneto-optical disk 100 and a second deflecting prism 251 and detectors 28 and 281 are arranged at its side. Detectors 28 and 281 are both connected to subtractor 302 and adder 301 through I/V converters 311 and 312 respectively. Adder 301 is connected through clock extraction circuit (CSS) 37 to PLL circuit 39. Subtractor 302 is connected to a decoder 38 through a sample/hold (S/H) circuit 41 that samples and holds a signal in synchronism with the clock, an A/D conversion circuit 42 that performs analogue/digital conversion likewise synchronised with the clock and a binary signal processing circuit (BSC) 43.

In the above apparatus construction, light that is launched from laser 22 is converted to a parallel beam by a collimator lens 23, passes through a deflecting prism 25 and is condensed onto magneto-optical disk 100 by object lens 24. The reflected light from disk 21 is directed towards deflecting prism 251 by deflecting prism 25 and passes through a half-wavelength plate 26 after which it is divided into two directions by deflecting prism 251. The divided beams are condensed by respective detector lenses 27 and fed to photodetectors 28 and 281. Now pits for generating a tracking error signal and for generating a clock signal are formed beforehand on magneto-optical disk 100. The signal indicating the reflected beam from the clock signal generating pits is detected by detectors 28 and 281 and is then extracted by clock extraction circuit 37. PLL circuit 39, which is connected to clock extraction circuit 37, then generates a data channel clock.

On data recording, laser 22 is modulated with a fixed frequency by laser drive circuit 32 such that it is synchronised with the data channel clock to emit a continuous stream of optical pulses of narrow width, which produce local heating of the data recording area of the rotating magneto-optical disk 100 at equal intervals. Also, the data channel clock controls encoder 30 of the magnetic field application unit so that it generates a data signal of the reference clock period. The data signal is sent to magnetic coil drive circuit 34 through phase adjustment circuit 31. Magnetic coil drive circuit 34 controls magnetic field coil 29 such that it applies a magnetic field of polarity corresponding to the data signal to the heated parts of the data recording area of magneto-optical disk 100.

Figure 8:
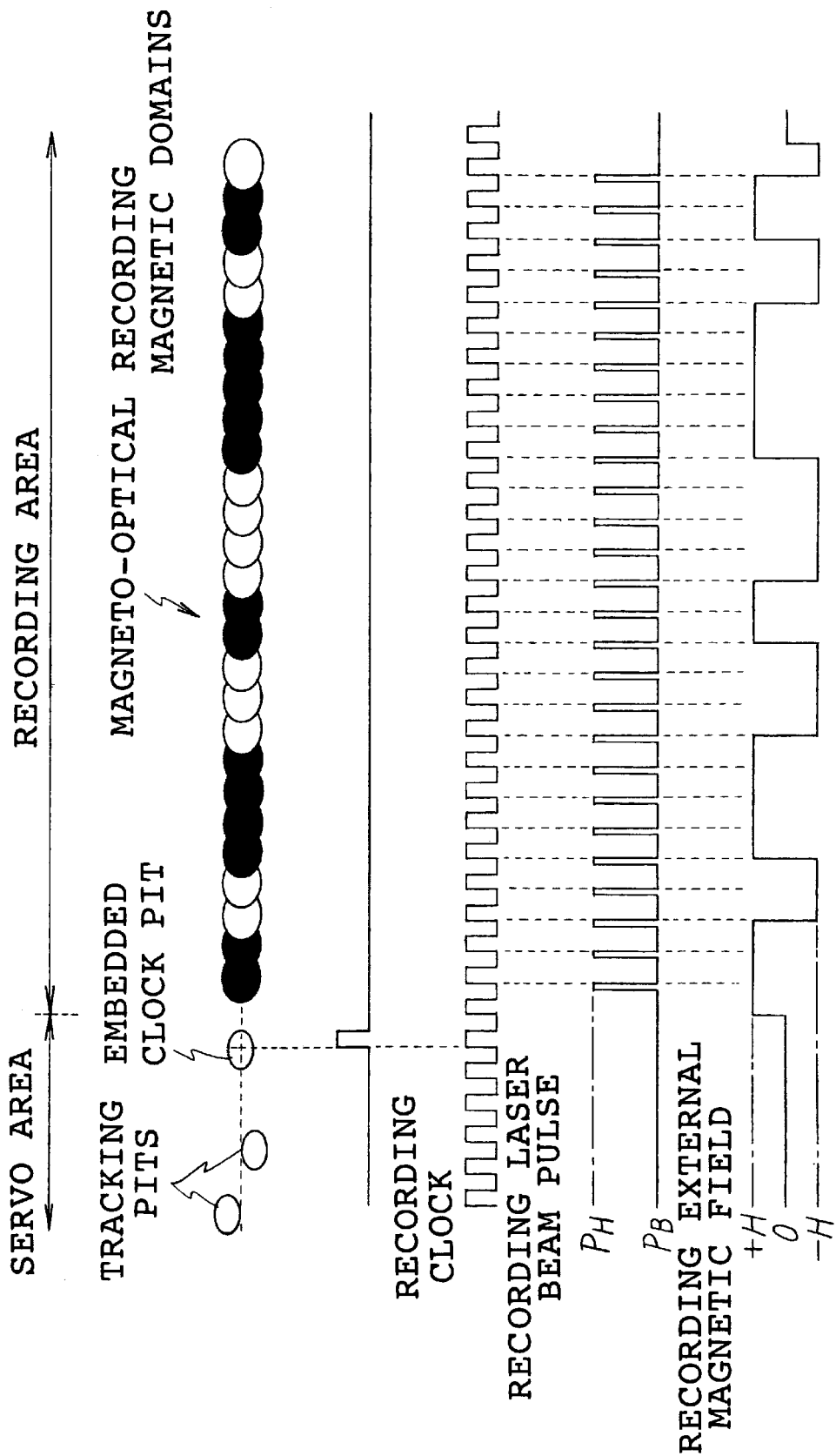
FIG. 8 is a timing chart showing the relationship between a recording laser pulse, a recording external magnetic field and recording magnetic domain in a magneto-optical field recording method according to Embodiment 2 of the present invention.

The recording and reproducing characteristic of the magneto-optical disk sample manufactured in Embodiment 1 was measured using a magneto-optical recording and reproducing apparatus 101. The laser wavelength of the optical head of magneto-optical recording and reproducing apparatus 101 was 685 nm, and the numerical aperture NA of the object lens was 0.55. Data recording was conducted with a duty ratio of the laser beam pulse of 35%, using a magneto-optical field laser pumped magnetic field modulation recording system in which recording was performed under illumination by laser beam pulses of fixed period at a linear velocity of 5.0 m/sec, the external magnetic field being modulated with ±300 (Oe). FIG. 8 shows a timing chart of the recording laser beam pulse and the recording external magnetic field with respect to the recording clock. The pattern of minute magnetic domains formed by this recording is shown at the top of FIG. 8. The minute magnetic domains were formed with a diameter of 0.4 micron.

Figure 9:
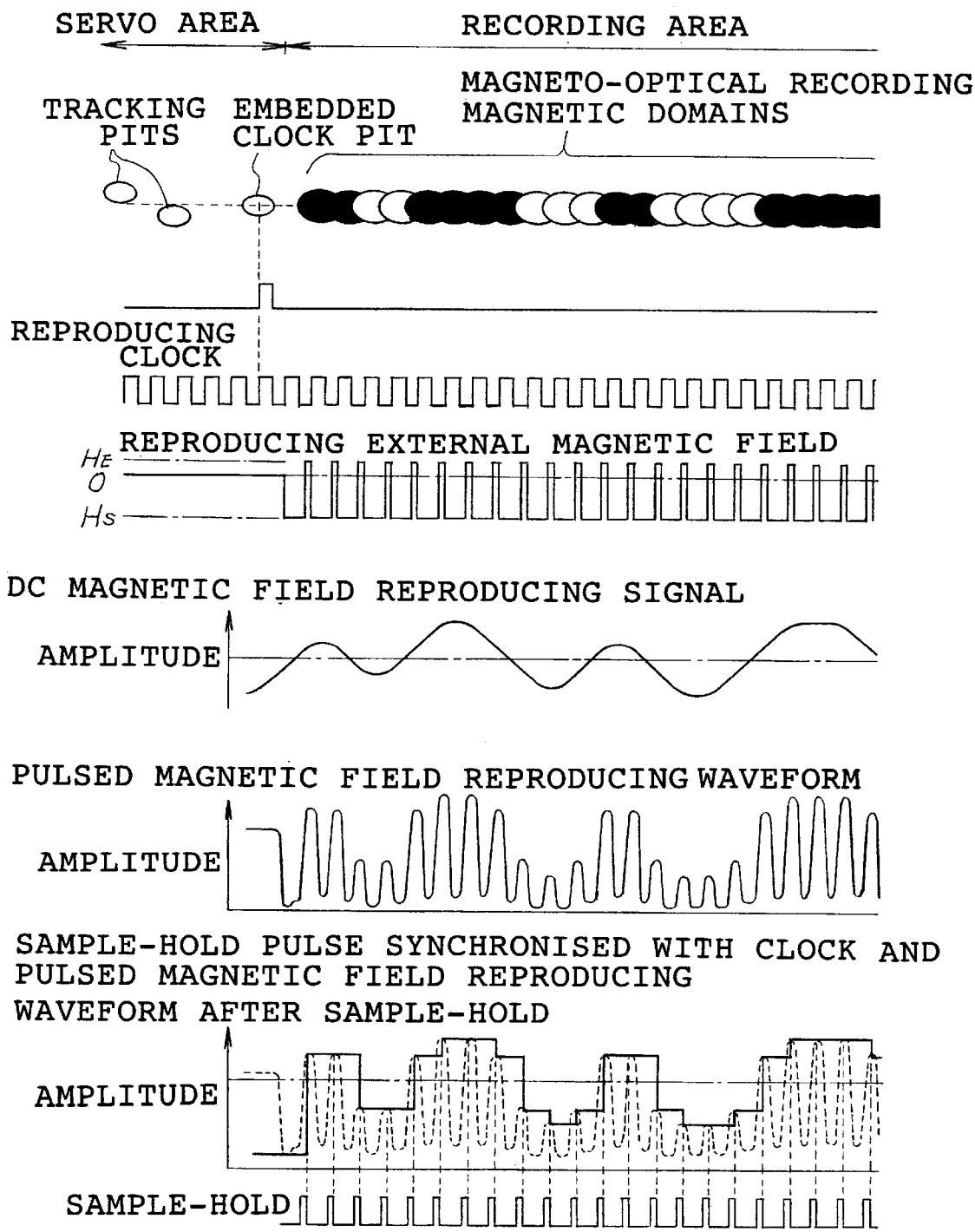
FIG. 9 is a timing chart showing the reproduction signal waveforms produced by the reproduction clock, the reproduction external magnetic field, and pulsed magnetic field in the reproducing method according to Embodiment 2 and the reproduction signal waveform after sampling and holding.

Next, the magneto-optical recording medium on which minute magnetic domains had been recorded was reproduced as follows using the apparatus shown in FIG. 7. The reproduction laser beam power used was 3.5 mW; the reproduction clock was synchronised with the recorded magnetic domains, one by one, and a magnetic field modulated in pulsed fashion was applied in such a way as to be synchronised with this reproduction clock. FIG. 9 shows a timing chart of the reproduction external magnetic field and the reproduction signal with respect to the reproduction clock. The intensity of the pulsed magnetic field in the vicinity of the magnetic domain centre was made 150 (Oe) (HE) in the recording direction (direction of magnetic domain magnification) and 250 (Oe) (HS) in the erasure direction (direction of magnetic domain reduction), the duty ratio in the recording direction being 25%. The sample-hold timing of the reproduction signal was made the same as the modulation timing of the magnetic field.

As can be seen from the reproduced waveform shown in FIG. 9 (pulsed magnetic field reproduced waveform), respective independent signals are obtained from the minute magnetic domains. For comparison, the Figure also shows the reproduction signal (DC magnetic field reproduction signal) obtained if the magnetic field is unmodulated i.e. when reproduction is performed in the same way as described above except applying a DC magnetic field of 200 (Oe) in the recording direction. In the case of the DC magnetic field, the reproduction signal waveforms from adjacent magnetic domains join up with each other. The lower part of FIG. 9 shows the reproduction signals produced by a sample-hold pulse synchronised with the clock and a pulsed magnetic field after sample-hold. It can be seen that the analogue reproduction signal amplitude after sample-hold is greatly increased compared with the case where no reproduction magnetic field is applied.

Figure 10:
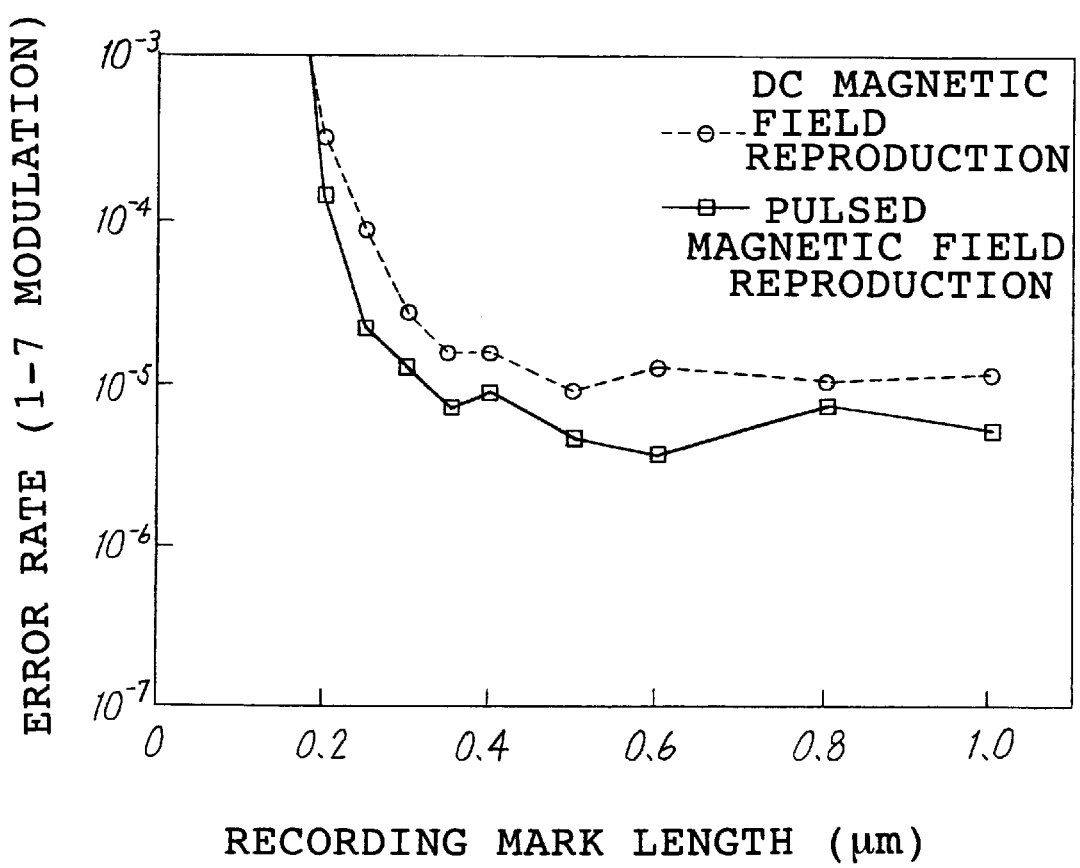
FIG. 10 is a graph showing the relationship of error rate in 1–7 modulation of the reproducing method in Embodiment 2 of the present invention with recording mark length.

Also, FIG. 10 shows a comparison of the relationship of the error rate to recording mark length when 1–7 modulation recording was performed, for the case where a pulsed magnetic field was used as reproduction magnetic field and for the case when a DC magnetic field was used. From the results of FIG. 10 it can be seen that the error rate is improved when a pulsed magnetic field is employed and satisfactory data reproduction can be achieved even for a recording mark length of 0.25 μm. Consequently, by performing reproduction by applying a pulsed magnetic field to a magneto-optical recording medium according to the present invention, high-density recording and reproduction can be achieved.

Figure 11:
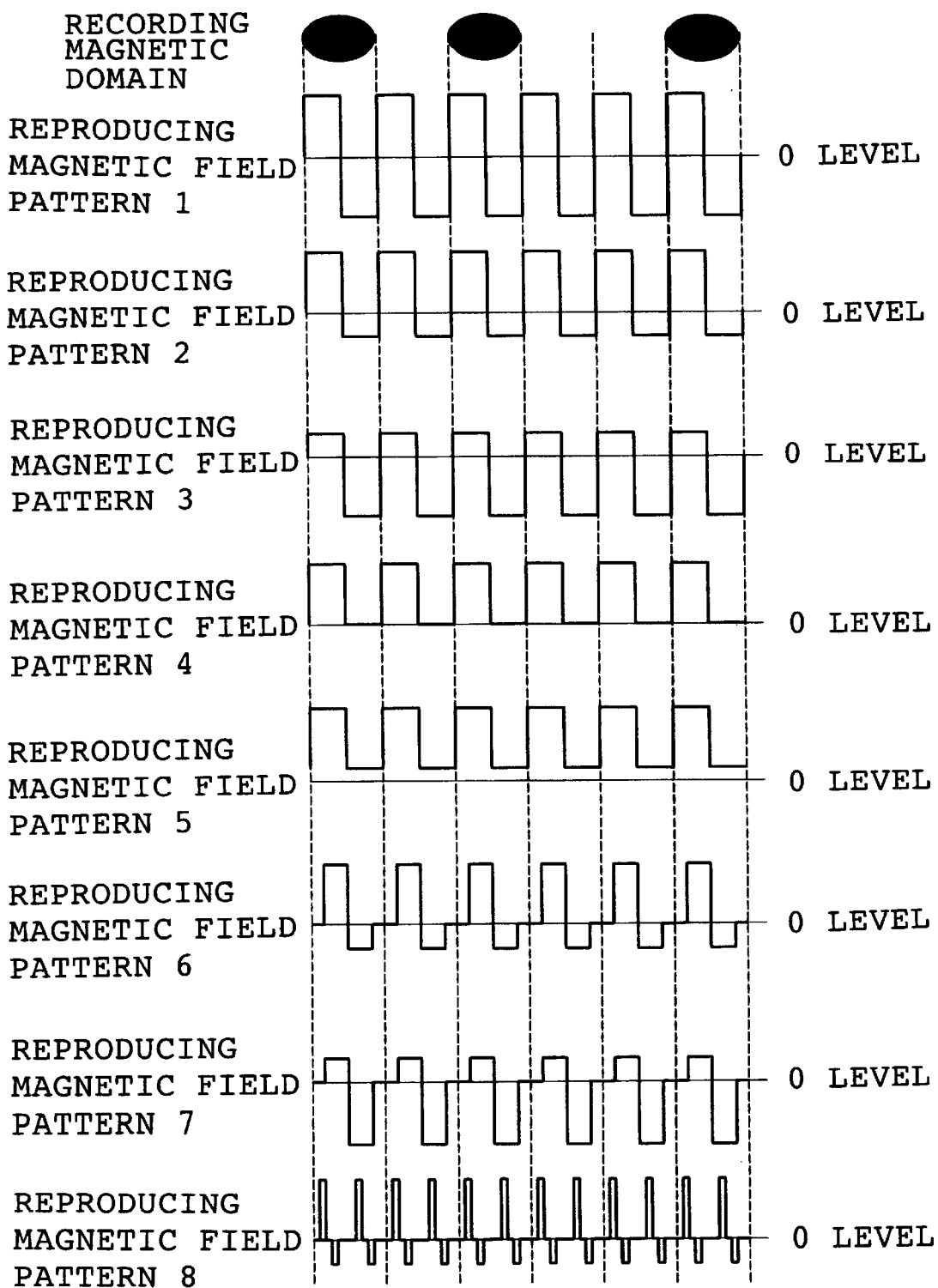
FIG. 11 is a view showing various reproduction magnetic field patterns that can be employed in the reproducing method in Embodiment 2 of the present invention.

The various patterns shown in FIG. 11 can be employed for the configuration and timing of the recording magnetic domains and reproduction magnetic field pulse in this embodiment. Whether, as in the case of reproduction magnetic field pattern 1, HE=−HS; whether, as in the case of reproduction magnetic field patterns 2 and 3, HE≠−HS; whether, as in the case of reproduction magnetic field pattern 4, HS=0 or HE=0, whether, as in the case of reproduction magnetic field pattern 5, HE and HS are of the same polarity; or whether, as in the case of reproduction magnetic field patterns 6~8, there is an interval for which H=0 between HE and HS, in whichever case, if an appropriate value of between 20~80% is taken for the duty ratio of HE and HS, the effect of magnifying the recording magnetic domain i.e. amplifying the reproduction signal is obtained.

Embodiment 3

In this embodiment, a modified example of the recording and reproducing apparatus shown in Embodiment 2 will be described. Recording and reproducing apparatus 103 shown in FIG. 12, in the apparatus construction shown in FIG. 7, is further provided with: a reproduction pulse width/phase adjustment circuit (RP-PPA) 53 (first synchronisation signal generating circuit) for pulse modulation of the reproducing light beam in synchronism with the PLL clock and with a recording and reproducing changeover switch (RC/RP SW) 55 for changing over reproduction pulses and recording pulses on recording and reproducing. Other parts are the same as in magneto-optical recording and reproducing apparatus 101 described in Embodiment 2, so such corresponding parts are indicated by the same symbols and further description is omitted.

The recording and reproducing characteristic of magneto-optical recording medium 11 manufactured in Embodiment 1 is measured by a recording and reproducing apparatus 103. The wavelength of laser 22 of recording and reproducing apparatus 103 is 685 nm and the numerical aperture NA of object lens 24 is 0.55. Data recording is performed using an optical magnetic field modulation recording system where in recording is effected by modulating an external magnetic field at ±300 (Oe) whilst applying a laser beam with pulses of fixed period, with a linear velocity of 5.0 m/sec; the duty ratio of the laser beam pulses was 50%. The timing of the recording laser beam pulses and of the recording external magnetic field with respect to the recording clock was the same as in the timing chart shown in FIG. 8. Minute magnetic domains were formed with diameter of 0.4 micron.

A magneto-optical recording medium on which minute magnetic domains as described above had been recorded was reproduced as described below using the apparatus shown in FIG. 12. As shown by the timing chart of FIG. 13, the intensity of the reproduction laser beam was modulated with fixed period synchronised with the reproduction clock. A peak power ($P_R$) of the reproduction laser beam of 5.5 mW and a bottom power ($P_B$) of 0.5 mW were used and the peak duty ratio was set to 33%. As in the case of Embodiment 2, the reproduction magnetic field was modulated in synchronism with the reproduction clock, for the magnetic domains that were being reproduced one by one as shown in FIG. 13. The intensity of the pulses magnetic field was 250 (Oe) (HE) in the recording direction in the vicinity of the magnetic domain centre and 150 (Oe) in the erase direction (HS), with a duty ratio in the recording direction of 25%. Also, the sample-hold timing of the reproduction signal was the same as the modulation timing of the magnetic field. Regarding the timing of the reproduction magnetic field and the reproducing light beam, as shown in FIG. 13, the fall of the reproduction laser beam pulse and the fall of the reproduction magnetic field pulse were aligned. The duty ratio in the recording direction of the magnetic field on reproduction was 25% but as explained in connection with Embodiment 5, to be described, it could be altered in the range 15~90%.

Figure 13:
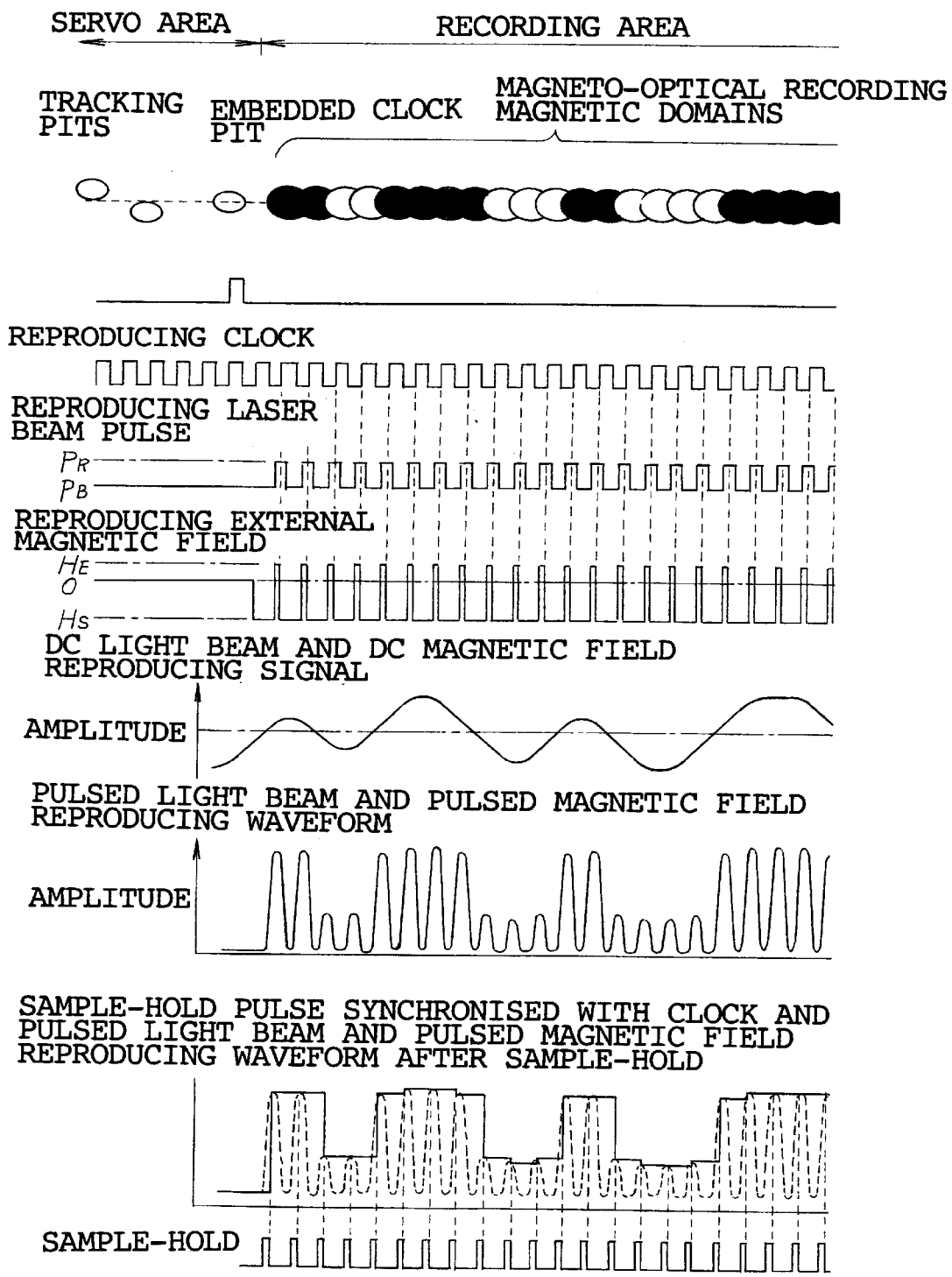
FIG. 13 is a timing chart showing the reproduction signal waveforms produced by the reproduction clock, the reproduction external magnetic field, and pulsed beam/pulsed magnetic field in the reproducing method according to Embodiment 3 and the reproduction signal waveforms after sampling and holding.
Figure 14:
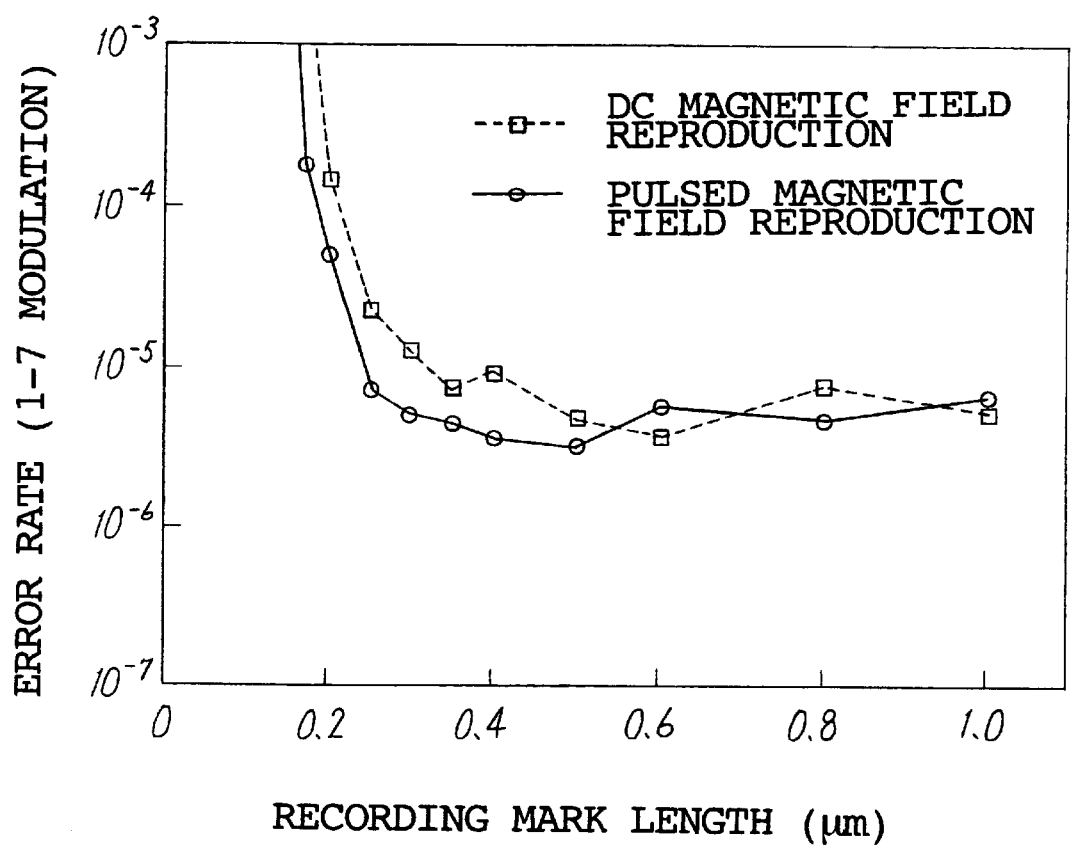
FIG. 14 is a graph showing the relationship of error rate in 1–7 modulation of the reproducing method in Embodiment 3 of the present invention with recording mark length.

As is clear from the reproduction waveform (reproduction waveforms of the pulsed beam and pulsed magnetic field) shown in FIG. 13, respective independent reproduction signals are obtained from the minute magnetic domains. For comparison, the reproduction signal (DC beam, DC magnetic field reproduction signal) obtained when reproduction was performed in the same way but whilst applying a DC laser beam of laser power 1.5 mW and a DC magnetic field of 200 (Oe) in the recording direction is shown in the same Figure. With the DC beam, DC magnetic field, there production signal waveforms from adjacent magnetic domains join up with each other. The bottom part of FIG. 13 shows a sample-hold pulse synchronised with the clock and the reproduction signal produced by a pulsed magnetic field after sample-hold. In this embodiment, by modulating the reproducing light beam, inversion of magnetization in the portions of the magnetic domain magnifying and reproducing layer in which no transferred magnetic domain is present can be effectively prevented. Also, the relationship of error rate to recording mark length when 1–7 modulation recording was effected is compared in FIG. 14 for the case where a pulsed laser is employed as reproducing light beam and for case where a continuous beam (DC beam) is employed. It can be seen from the results of FIG. 14 that the error rate of reproduction is improved using the pulsed magnetic field.

Figure 15:
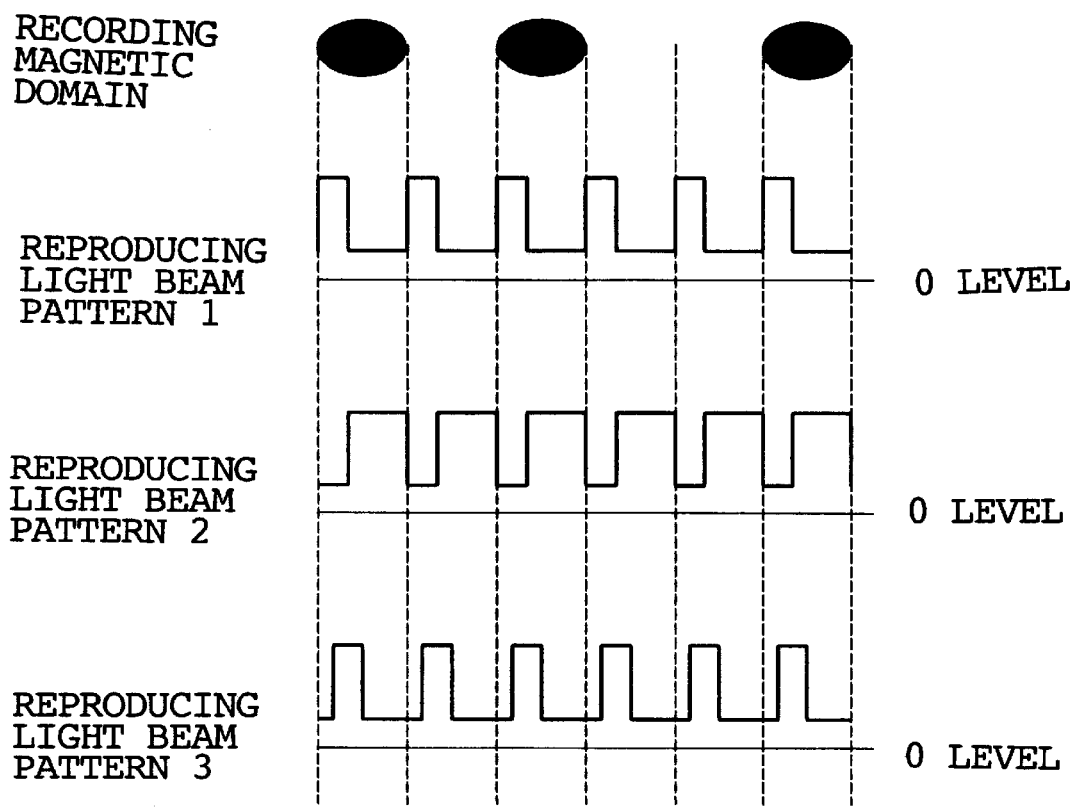
FIG. 15 is a view showing various reproduction optical pulse patterns that can be employed in the reproducing method in Embodiment 3 of the present invention.

It should be noted that the timing and duty ratio of the reproducing light beam pulse can be altered as shown in the reproducing light beam patterns 1~3 of FIG. 15. Also the timing and duty ratio of the reproduction magnetic field pulse and the polarity of the reproduction magnetic field pulse can be altered as shown in FIG. 11 just as in Embodiment 2. Furthermore, any of the patterns of reproducing light beam pulses and reproduction magnetic field pulses shown in FIG. 15 can be combined in any way with any of the patterns shown in FIG. 11.

Figure 16:
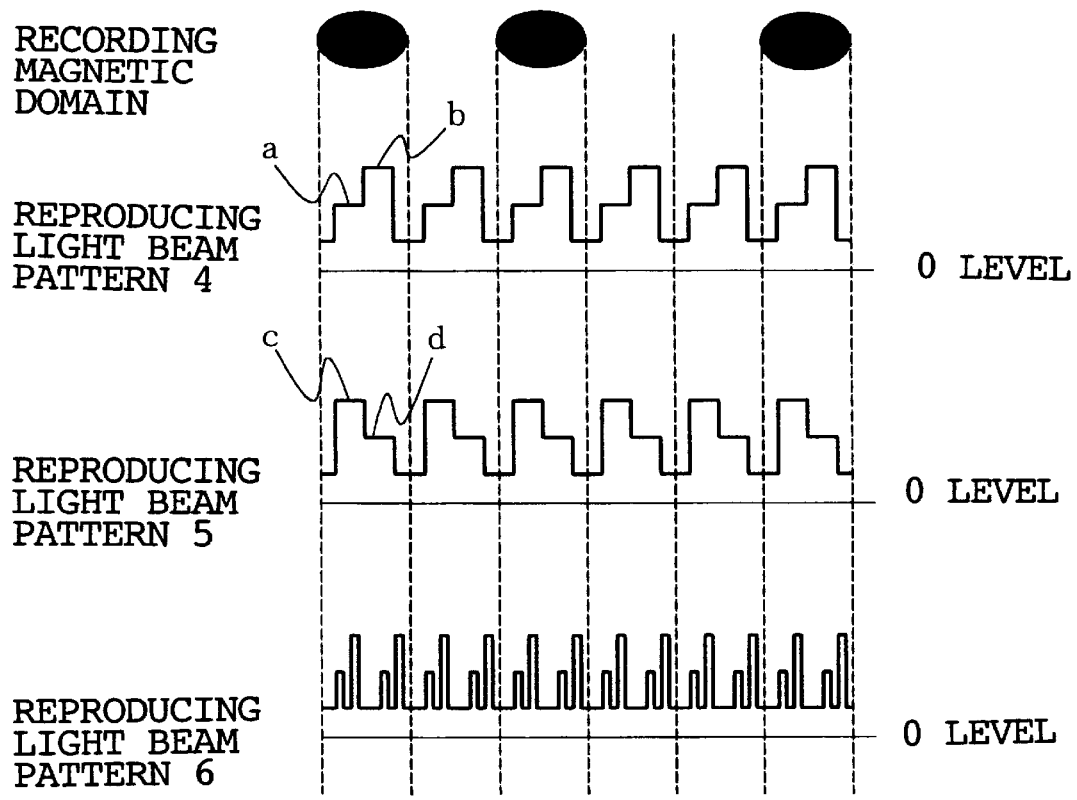
FIG. 16 is a view showing various multi-pulse reproduction optical pulse patterns that can be employed in the reproducing method in Embodiment 3 of the present invention.

In Embodiment 3, reproduction of the recording magnetic domains was performed by binary modulation of the reproduction laser beam, but by using a multi-pulse reproduction laser beam, the process of transfer and magnification of the magnetic domains can be more reliably controlled and the configuration of the magnetic domains on magnification can be stabilised. An example of this is shown in FIG. 16. FIG. 16 shows the relationship between recording magnetic domains and reproducing light beam pattern. In this method, magnetic domain transfer, magnification and reproduction are performed by continuous pulsed irradiation with the optimum reproduction power for transfer in first auxiliary magnetic film 5 of magneto-optical recording medium 11 of FIG. 1 and the optimum reproduction power for magnification of the magnetic domains in second auxiliary magnetic film 4. That is, in the method illustrated, in reproducing light beam patterns 4 and 5, transfer is reliably performed at portions a and c, and magnification is reliably performed at portions b and d, thereby stabilising the magnetic domain configuration. Reproducing light beam pattern 4 shows a case where the reproducing power suitable for transfer is lower than the reproducing power suitable for magnification; reproducing light beam pattern 5 shows the opposite case.

Embodiment 4

In recording and reproducing apparatus 101 shown in Embodiment 2 (FIG. 7), the clock signal that is output from PLL circuit 39 to phase adjustment circuit 31 for driving magnetic coil driving and reproduction pulse width/phase adjustment circuit 131 and recording pulse width/phase adjustment circuit 51 for laser drive is generated by an embedded clock extraction circuit 37 by detecting the reflected beam from pits formed in the substrate of magneto-optical recording medium 100 (11). Also, in recording and reproducing apparatus 103 shown in Embodiment 3 (FIG. 12), the clock signal that is output from PLL circuit 39 to phase adjustment circuit 31 for magnetic coil driving and reproduction pulse width/phase adjustment circuit 131 and recording pulse width/phase adjustment circuit 51 for laser drive and reproduction pulse width/phase adjustment circuit 53 was generated by an embedded clock extraction circuit 37 by detecting the reflected beam from the pits formed in the substrate of the magneto-optical recording medium. In this embodiment, in the reproducing apparatus of the present invention (recording and reproducing apparatus), various methods of generating a reproducing clock are illustrated which are effective for pulse modulation of in particular the external magnetic field for reproduction and the reproducing light beam.

The following three methods are available for generating a reproducing clock. The first method is self PLL synchronisation; the second method is external PLL synchronisation; and the third method is 2-period sampling. As the apparatus construction, in order to implement the first and third methods, in the apparatuses shown in FIG. 7 and FIG. 12, a signal processing system omitting embedded clock extraction circuit 37 may be employed. On the other hand, in order to implement the second method, the signal processing system of the apparatuses shown in FIG. 7 and FIG. 12 may be employed without modification.

Figure 17:
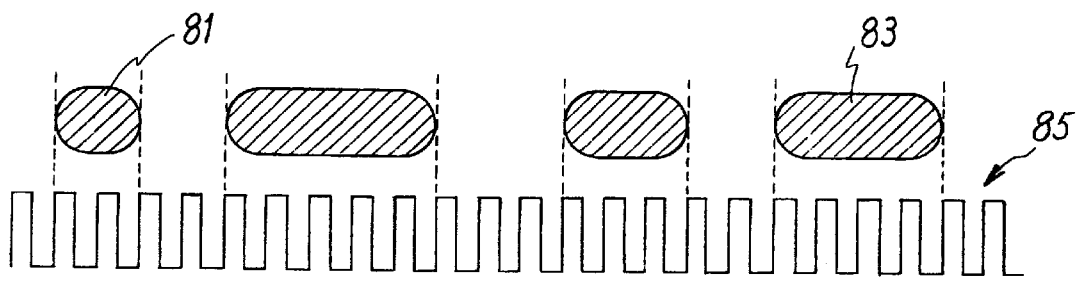
FIG. 17 is a view given in explanation of self-synchronisation for generating a clock signal that is capable of being used in the apparatuses of Embodiments 2 and 3.

FIG. 17 is a diagram given in explanation of the first method i.e. self PLL synchronisation. In FIG. 17, clock 85 is generated by detecting recorded magnetic domains (magnetic marks) 81 and 83 and performing processing by adder 301 and PLL 39 shown in FIG. 7 (or FIG. 12).

Figure 18:
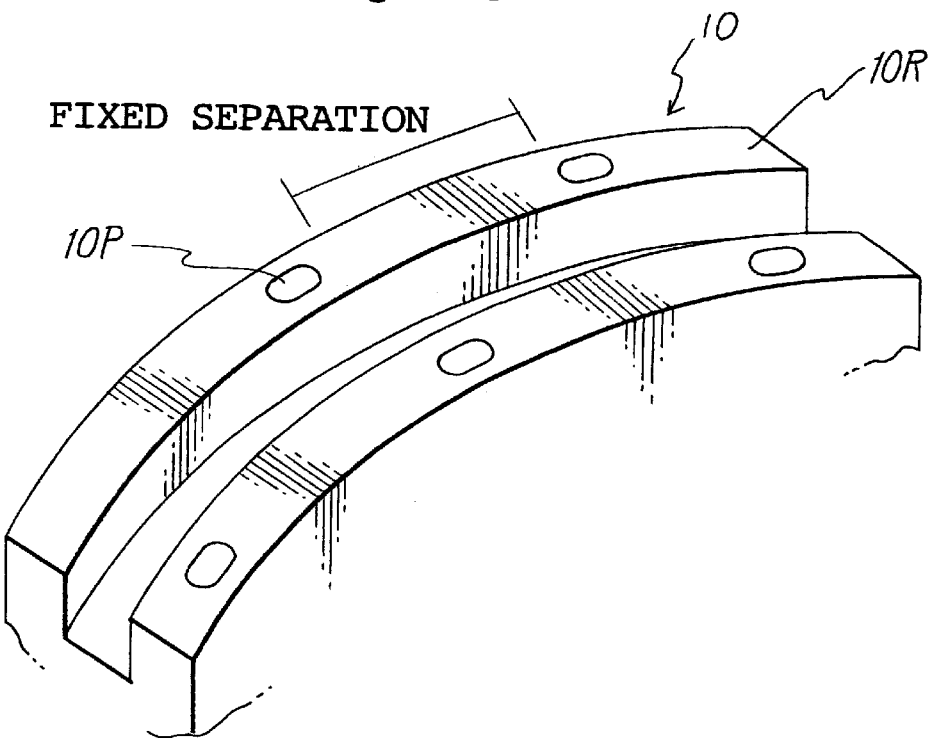
FIG. 18 is a view given in explanation of external synchronisation for generating a clock signal that is capable of being used in the apparatuses of Embodiments 2 and 3 using a land groove type magneto-optical recording medium.
Figure 19:
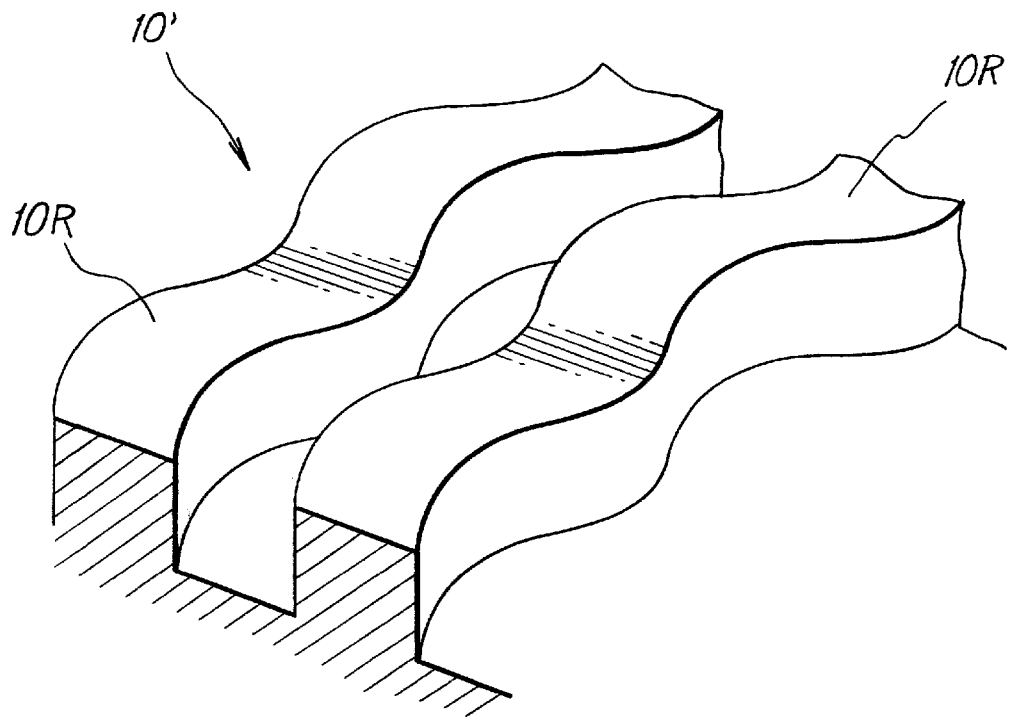
FIG. 19 is a view given in explanation of external synchronisation for generating a clock signal capable of being employed using a wobble-shaped land groove type magneto-optical recording medium in the apparatuses of Embodiments 2 and 3.
Figure 20:
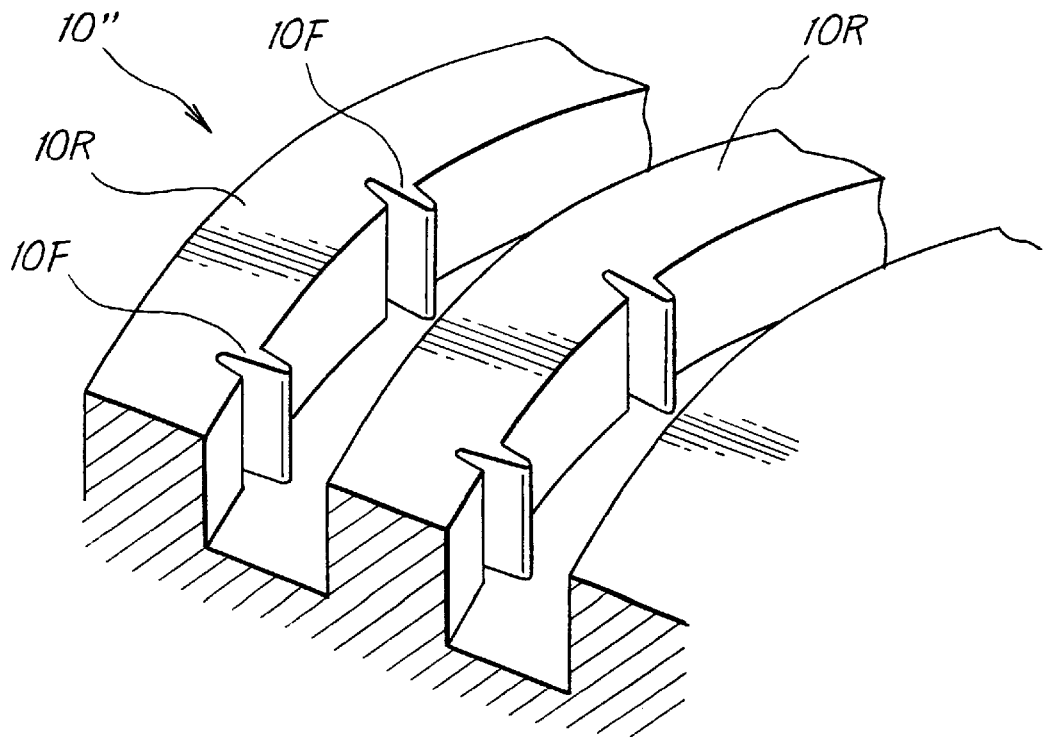
FIG. 20 is a view given in explanation of external synchronisation for generating a clock signal capable of being employed using a land groove type magneto-optical recording medium having fine clock marks in the apparatuses of Embodiments 2 and 3.

The second method, which is external PLL synchronisation, is described using FIG. 18~FIG. 20. FIG. 18 is a detail view to a larger scale of a magneto-optical recording medium 10 in the case wherein the magneto-optical recording medium is of land/groove construction. In land part 10R (or groove part) of magneto-optical recording medium 10, pits 10p are provided with a fixed period. The clock is generated by optically detecting pits 10p and matching the detected period. In this case, instead of fixed period pits 10P in land 10R, it would be possible to detect optically projections, or changes of the material such as changes of crystalline mode. FIG. 19 is a detail view to a larger scale of a magneto-optical recording medium 10' in the case wherein the magneto-optical recording medium is of wobble-type land/groove construction. In a wobble-type land/groove construction, a clock can be generated by detecting the period of the wobble and using this period.

FIG. 20 is a detail view to a larger scale of a magneto-optical recording medium 10" of land/groove construction in the case wherein fine clock marks 10F are provided instead of pits. Fine clock marks 10F can be provided at practically the same intervals as the intervals with which the pits 10p shown in FIG. 18 are formed; if one fine clock mark 10F is regarded as a single waveform, its wavelength (length in the track direction) is 1/300~1/50 of the separation of the fine clock marks 10F and its amplitude (amount of variation in the track width direction) can be adjusted from 100 to 300 nm. In FIG. 20, fine clock marks 10F are only formed on the wall on one side of land 10R, but they could be formed on both sides of land 10R. When fine clock marks 10F are detected using a photodetector whose detection area is divided into four so that the summation signal from each divided detection area is observed, a waveform of the shape of the fine clock marks 10F shown in FIG. 20 is obtained. An external synchronisation clock signal can be generated by converting the reproduced waveform which is thus obtained to binary form by comparing it with a prescribed reference value and synchronising with the rise timing of this binary signal. It should be noted that, in the magneto-optical recording medium of wobble-type land/groove construction shown in FIG. 19, there may be provided fine clock marks 10F as shown in FIG. 20, and the clock signal for modulating the reproduction external magnetic field and/or the reproducing light beam may be extracted from fine clock marks 10F while the recording data channel clock may be detected from the wobbling period.

Figure 21:
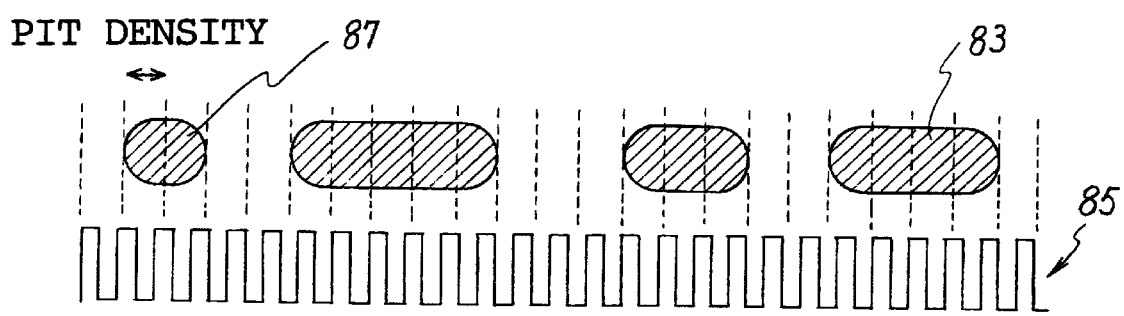
FIG. 21 is a view given in explanation of 2-period sampling for generating a clock signal capable of being employed in the apparatuses of Embodiments 2 and 3.

FIG. 21 is a diagram given in explanation of the third method i.e. 2-period sampling. In FIG. 21, clock signal 85 is generated by reproducing the shortest recording magnetic domain (unit bit) 87 that is recorded and processing this using adder 301 and PLL 39 shown in FIG. 7 (or FIG. 12). PLL circuit 39 is constituted so as to generate one or more clock periods in shortest recording magnetic domain 87; a clock of higher frequency than the repetition period of shortest recording magnetic domain 87 can thus be generated.

In the present invention, when the reproducing light beam and/or the reproduction external applied magnetic field are subjected to pulse modulation, a first synchronisation signal and/or a second synchronisation signal may be generated using the reproduction clock generated by any of the above three methods. Also, even when the recording external applied magnetic field and/or the recording beam are subjected to pulse modulation, a reproduction clock reproduced by any of the above three methods may be employed.

Embodiment 5

Figure 12:
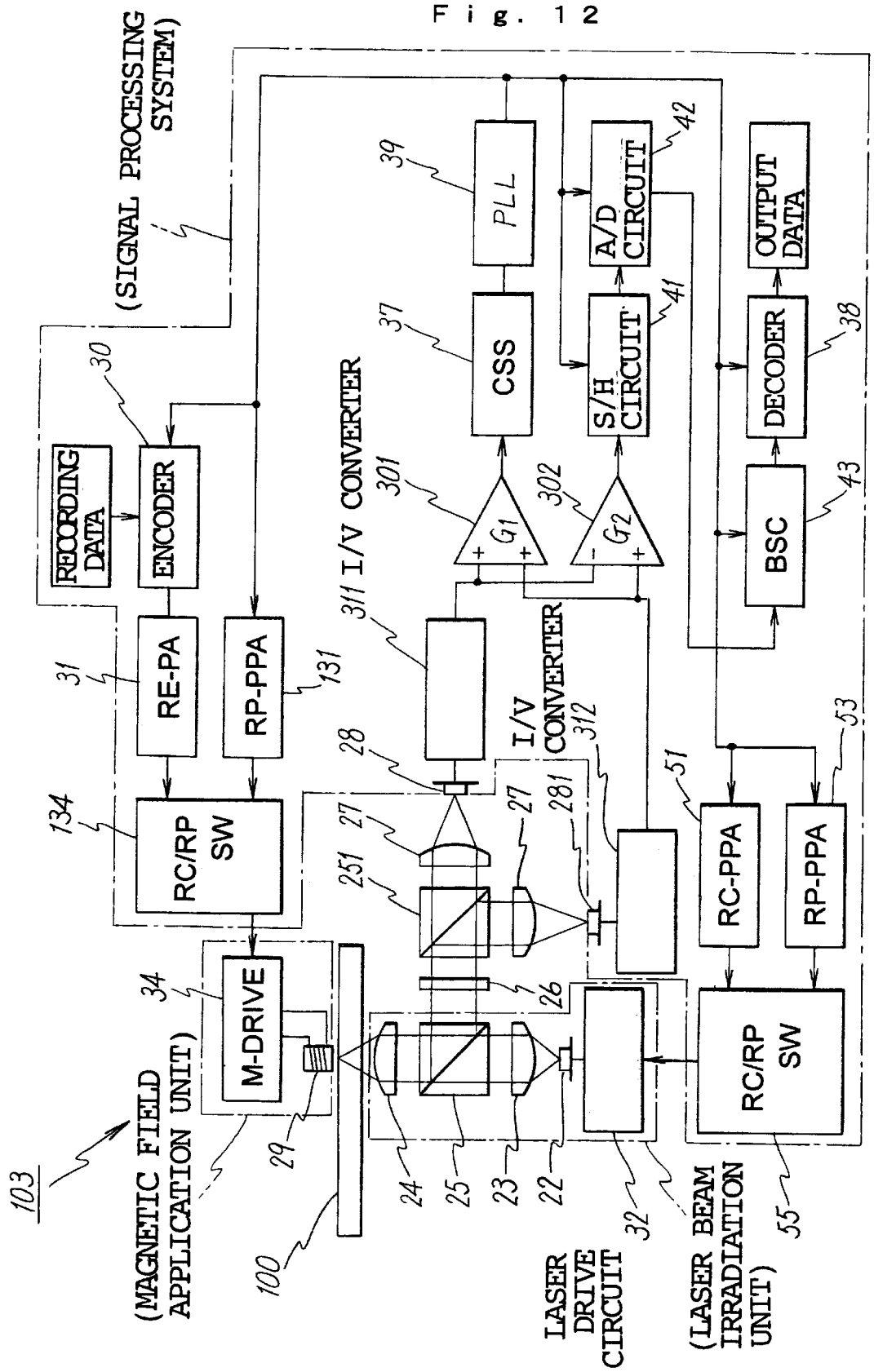
FIG. 12 is a constructional diagram of a magneto-optical recording and reproducing apparatus according to Embodiment 3 of the present invention; in this apparatus, a magneto-optical recording disk is employed wherein not just the external magnetic field but also the reproducing light beam is pulse-modulated in synchronism with a reproduction clock.

As described in the above embodiments, to achieve reproduction of magneto-optical recording medium 11 (10, 100, 101), an external magnetic field and/or reproducing laser beam were applied using the apparatus shown in FIG. 7 or FIG. 12. In this embodiment, the magnetic field application conditions best suited for reproduction by magnetic domain magnification were studied.

In the method of reproduction of a magneto-optical recording medium according to the present invention, the following four combinations may be considered for selection of one or other of "continuous (DC)" or "pulsed" for the magnetic field and laser beam, respectively:

(1) laser beam: continuous beam; magnetic field: continuous magnetic field
(2) laser beam: continuous beam; magnetic field: pulsed
(3) laser beam: pulsed; magnetic field: continuous magnetic field
(4) laser beam: pulsed; magnetic field: pulsed Of the above four cases, in cases (2)~(4), it is necessary to adjust the magnitude of the pulsed laser beam or magnetic field or both and the timing with which they are applied. In case (2) above, referring to FIG. 22A, it is possible to create effective inversion of magnetization by using different magnitudes for the external magnetic field Hep that is applied in the process of magnification of the magnetic domain constituting the sampling point and the external magnetic field Hsr that is applied in the process up to the next sampling. Also, in order to ensure that, in the reproduction of the adjacent magnetic domain, no effect remains of the magnified reproduction, the time T1 for magnetic domain magnification (duty of the magnetic field in the recording direction) is made shorter than the time T2 up to the next sampling, and is preferably in the range $0.15 \leq T1/(T1+T2) \leq 0.9$. This range is preferable also from the point of view of preventing overshoot in the waveform of the reproducing magnetic field, as will be described. Even more preferably, $0.15 \leq T1/(T1+T2) \leq 0.6$. For this time T1, an optimum value is selected based on various factors such as the magnetic properties of the magnetic layers constituting the magneto-optical recording medium.

In case (3) above, the magnetic domain of the recording layer is transferred to the reproduction layer; since time is required to set up the condition of magnetic domain magnification by conferring a wide temperature distribution, the duty of the pulses of the laser beam is preferably in the range 20~70%. FIG. 22B shows the relationship between the applied magnetic field ($H_{ex}$) in case (4) above and the period of the laser pulse. As shown in FIG. 22B, it is desirable for ON/OFF of the laser beam irradiation to be performed once in the time T1 for magnetization magnification for sampling and in the time T2 up to the next sampling, respectively, (in the Figure, the laser power is denoted by Pr). In the present invention, it is possible to employ any of the methods (1)~(4) referred to above. However, in order to achieve most reliable magnetic domain magnification and reproduction, it is necessary to lower the temperature of the medium every time reproduction is performed, so as to restore the condition of the in-plane magnetizable film. Due to this demand, it is desirable to employ pulsed beam irradiation, and a pulsed reproducing magnetic field is desirable so as to reliably perform magnetic domain magnification and reduction. For these reasons, reproduction under condition (4) is optimum.

Figure 22A:
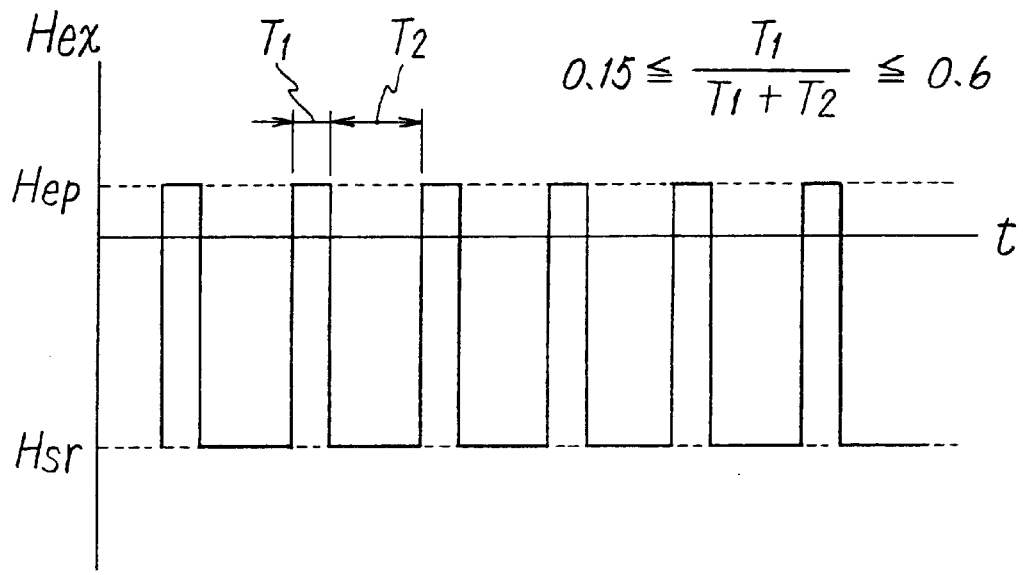
FIGS. 22A and B are views illustrating the period for application of a pulsed laser beam or magnetic field.
Figure 22B:
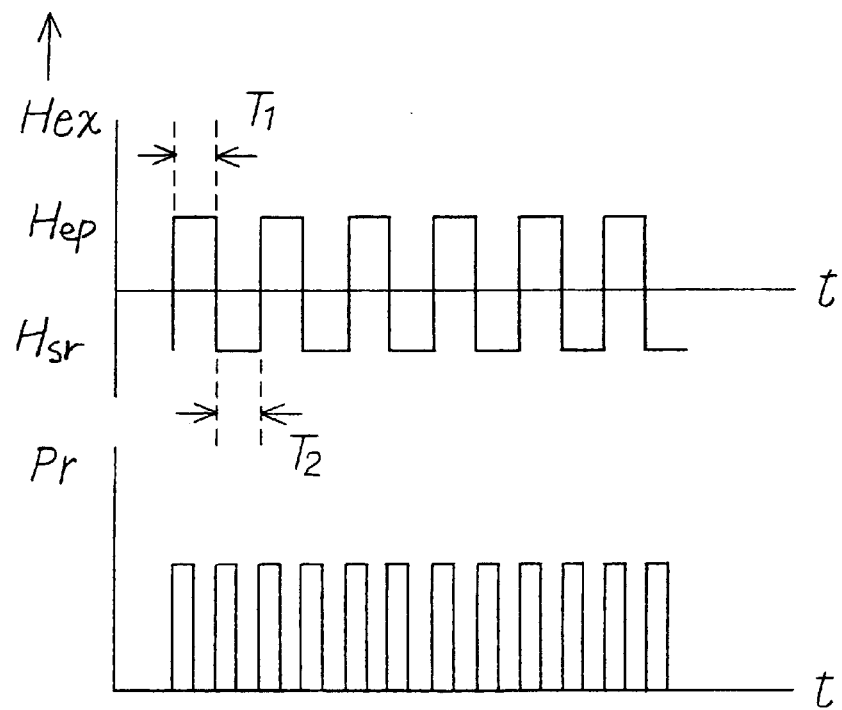
FIG. 22B is a view showing the period of a laser beam pulse with respect to an alternating magnetic field.
Figure 23:
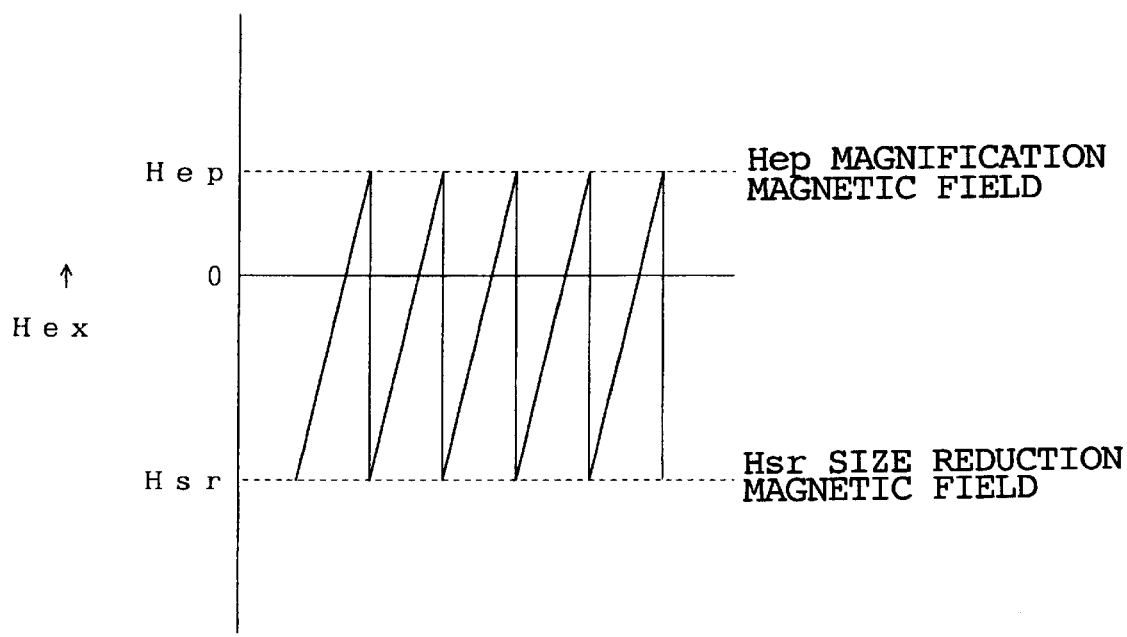
FIG. 23 is a view showing an example of a magnetic field of triangular waveform that can be employed as a magnetic field for magnetic domain magnification or size reduction.
Figure 24:
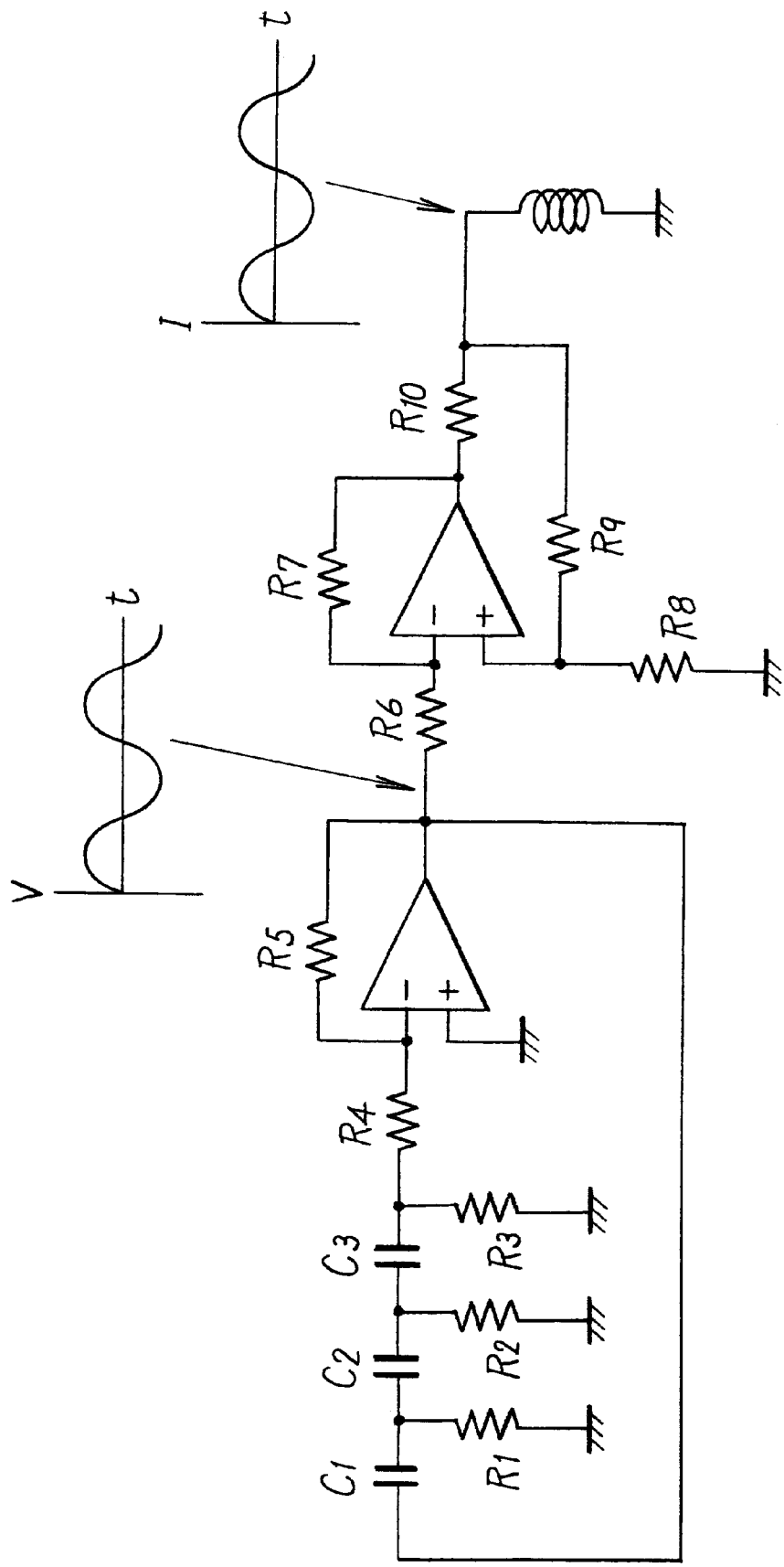
FIG. 24 is a view showing an example of a circuit for generating a sine-wave waveform that can be employed as a magnetic field for magnetic domain magnification or size reduction.

In FIGS. 22A and 22B, the applied alternating magnetic field was a magnetic field of square waveform but it would be possible to employ a magnetic field with any desired waveform so long as this gave substantially no overshoot. This is because if there is overshoot in the waveform of the magnetic field i.e. a steep rise in the waveform of the magnetic field and the magnetic field intensity at the peak is too great, irrespective of the direction of the recording magnetic domain of the information recording layer, the magnetic domain of the reproduction layer above this may be inverted, resulting in its being reproduced as a recorded signal. In order to prevent such overshoot, the triangular-wave waveform shown in FIG. 23 may be employed. By using a magnetic field of such a waveform, magnetic domain magnification can be facilitated by moderating the magnetic field change on magnification. The waveform is not restricted to being triangular; any desired waveform, such as a sine wave, can be employed so long as it provides a gradually increase of magnetic field. Even a square wave can be employed on condition that overshoot is not generated. FIG. 24 shows an example of a circuit for generating a sine wave which is ideal as a reproducing magnetic field waveform. A sine-wave reproducing magnetic field can be generated by combining the circuit shown in FIG. 24 with magnetic coil drive circuit 34 of recording and reproducing apparatus 101 (103) of FIG. 7 (FIG. 12).

Embodiment 6

Figure 25:
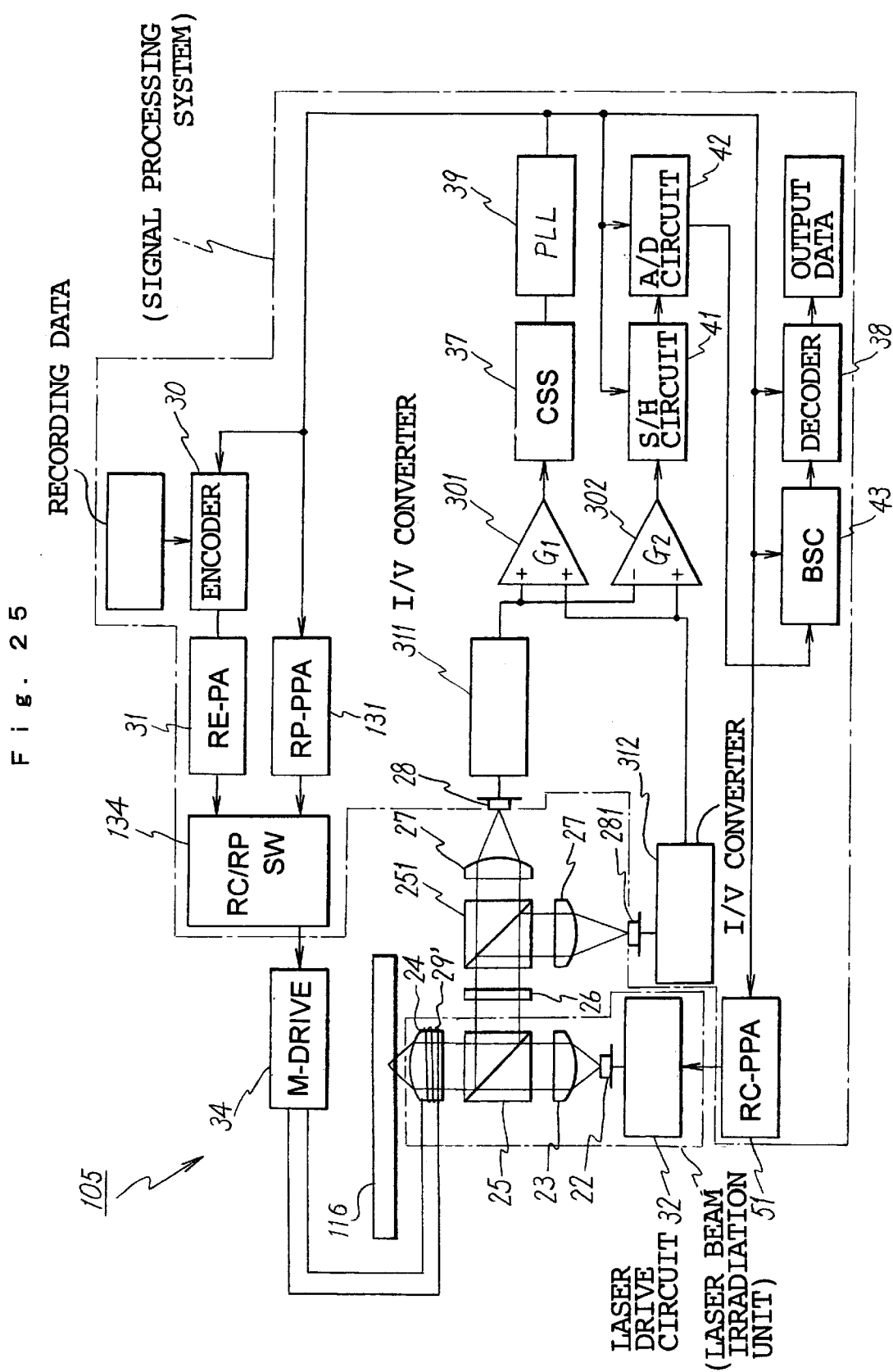
FIG. 25 shows a modified example of the magneto-optical recording and reproducing apparatus shown in FIG. 10 and is a constructional diagram of a reproducing apparatus in Embodiment 6 of the present invention whereby launching of a reproduction/recording beam can be performed from the same direction as application of an external magnetic field.

FIG. 25 shows a modification of the recording and reproducing apparatus 101 shown in FIG. 7. In the recording and reproducing apparatus 101 shown in FIG. 7, an external magnetic field is applied from above magneto-optical recording medium 100 and a beam for recording and reproducing is irradiated from below magneto-optical recording medium 100 i.e. from the substrate side. In the magneto-optical recording medium recording and reproducing apparatus 105 of FIG. 25, the external magnetic field and beam for recording and reproducing can be applied from the same direction. In order to achieve this, in recording and reproducing apparatus 105, the magnetic coil is wound onto object lens 24 for recording and reproducing to constitute a magneto-optical head in which the magnetic head and optical head are integrated.

Figure 26:
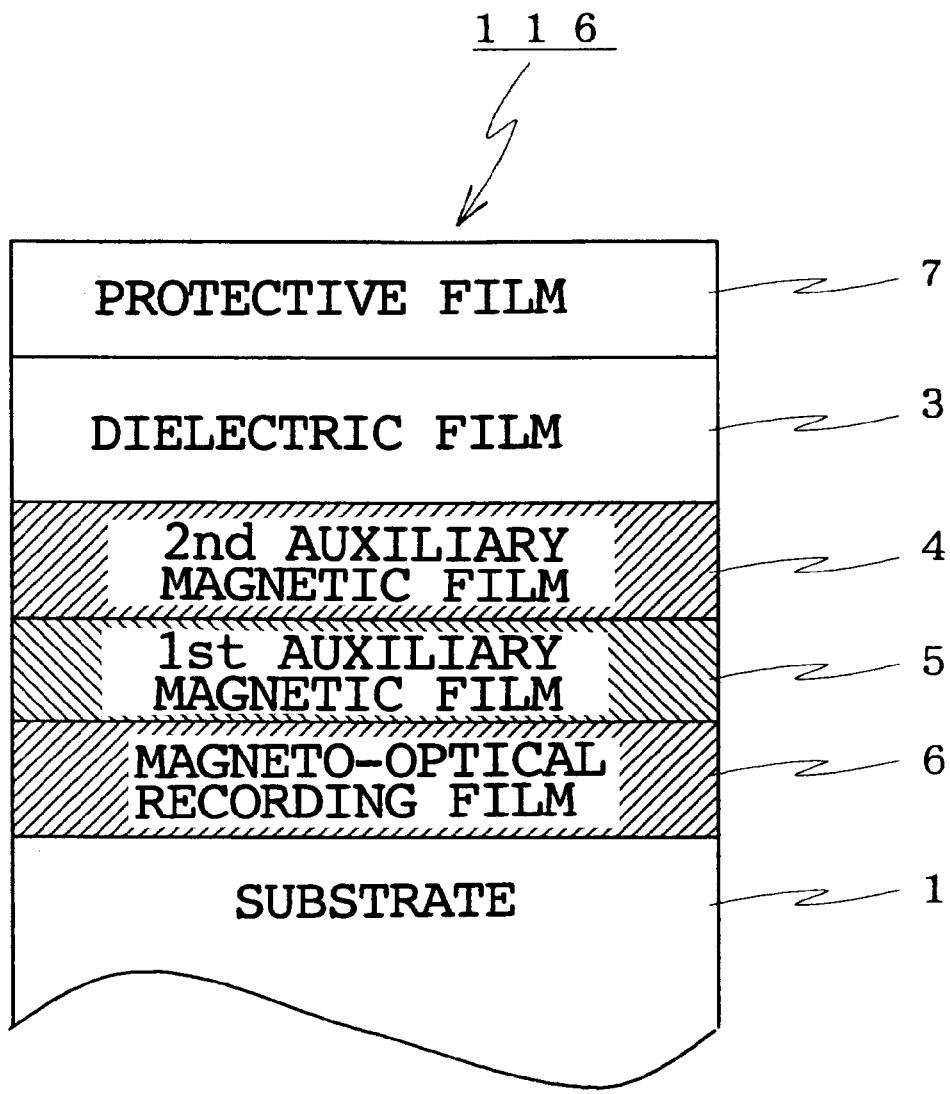
FIG. 26 is a cross-sectional view showing the stacked structure of a magneto-optical recording medium used in Embodiment 6.

FIG. 26 shows the construction of a magneto-optical recording medium which is well suited to this recording and reproducing apparatus 105. This magneto-optical recording medium 116 comprises successive layers of magneto-optical recording film 6, first auxiliary magnetic film 5, second auxiliary magnetic film 4, dielectric film 3, and protective film 7 on substrate 1. An adhesive layer consisting of a Cr layer or the like is formed between magneto-optic recording film 6 and first auxiliary magnetic film 5. In order to perform recording and reproducing of this magneto-optical recording medium 16, light is input not from the side of substrate 1 but from the side of the protective film 7 (second auxiliary magnetic film 4) and a magnetic field is applied. There is therefore no need for transparent material to be used for substrate 1 and it can be constituted of a metallic material such as aluminium or any desired other opaque material.

Figure 27:
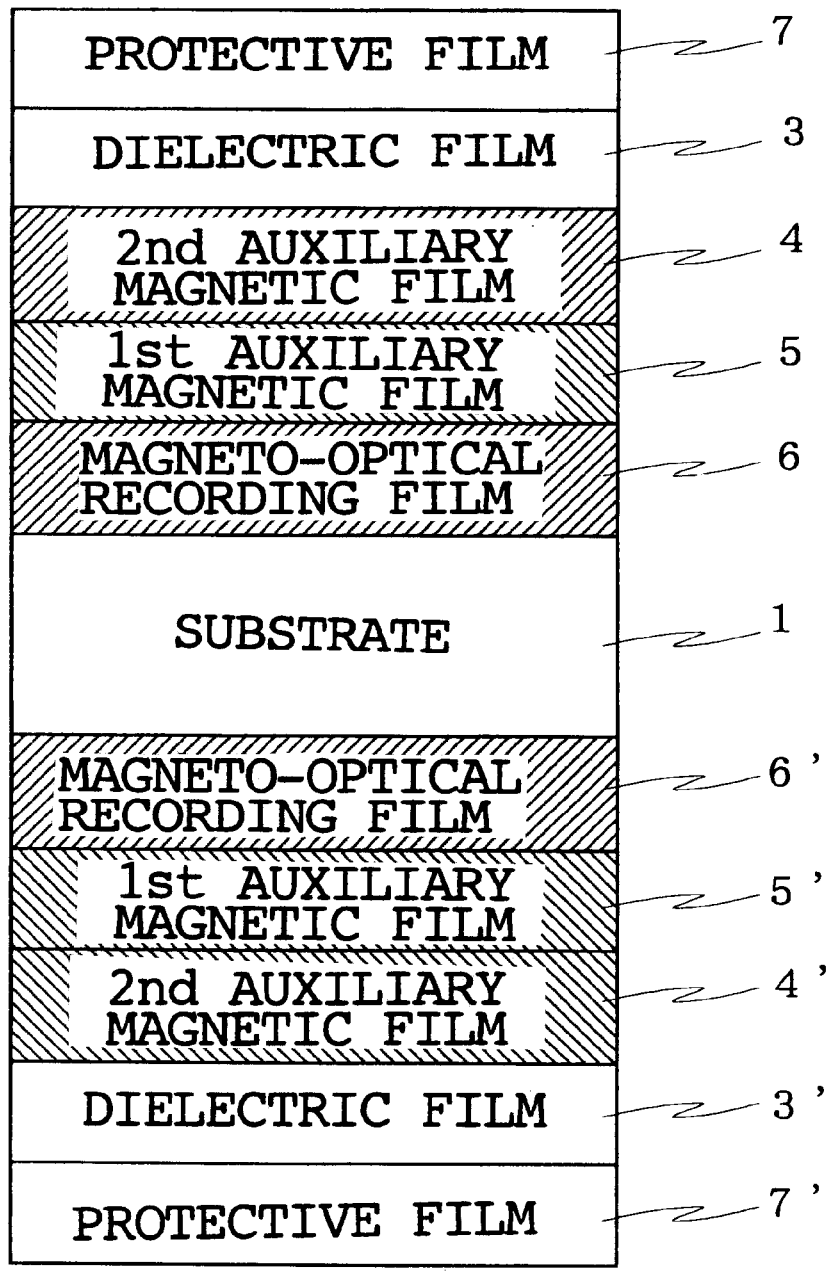
FIG. 27 is a cross-sectional view showing the stacked structure of a magneto-optical recording medium used in Embodiment 6 wherein magnetic layers are formed on both sides of a substrate.

Furthermore, by employing the apparatus of this embodiment, as shown in FIG. 27, a magneto-optical recording medium 117 of a construction produced by successive formation on both sides of substrate 1 of respective layers: magneto-optical recording films 6, 6', first auxiliary magnetic films 5,5', second auxiliary magnetic films 4, 4', dielectric films 3,3', and protective films 7, 7' can be reproduced. It is desirable that substrate 1 of magneto-optical recording medium 117 should be made of a material such as a metal so that recording or reproduction of one recording side does not affect recording or reproduction of the other recording side.

A magneto-optical recording medium that is capable of recording on both sides has twice the recording density of a conventional magneto-optical recording medium. In particular, to record or reproduce such a magneto-optical recording medium that is capable of recording on both sides with a recording and reproducing apparatus of the construction shown in FIG. 25, the magneto-optical recording medium may be turned over every time one side is recorded or reproduced. Consequently, this recording and reproducing apparatus allows the creation of large-capacity magneto-optical recording media as shown in FIG. 27. It should be noted that this magneto-optical head construction wherein the magnetic field and the light beam are applied from the same direction can also be applied to the recording and reproducing apparatus shown in FIG. 12.

Embodiment 7

Figure 28A:
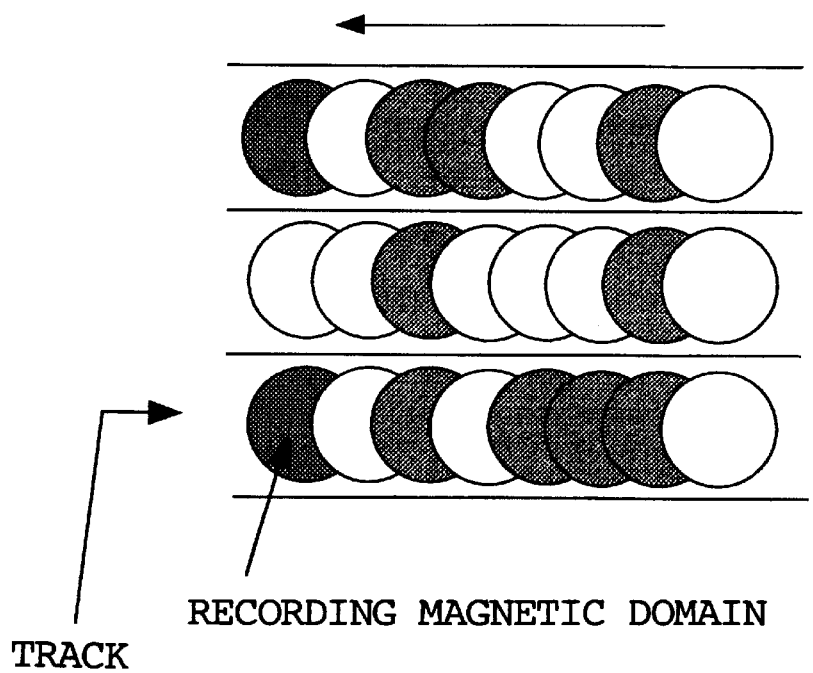
FIG. 28A is a diagram of a recording magnetic domain wherein recording is effected in a crescent configuration using a magnetic field modulation system according to Embodiment 7.
Figure 28B:
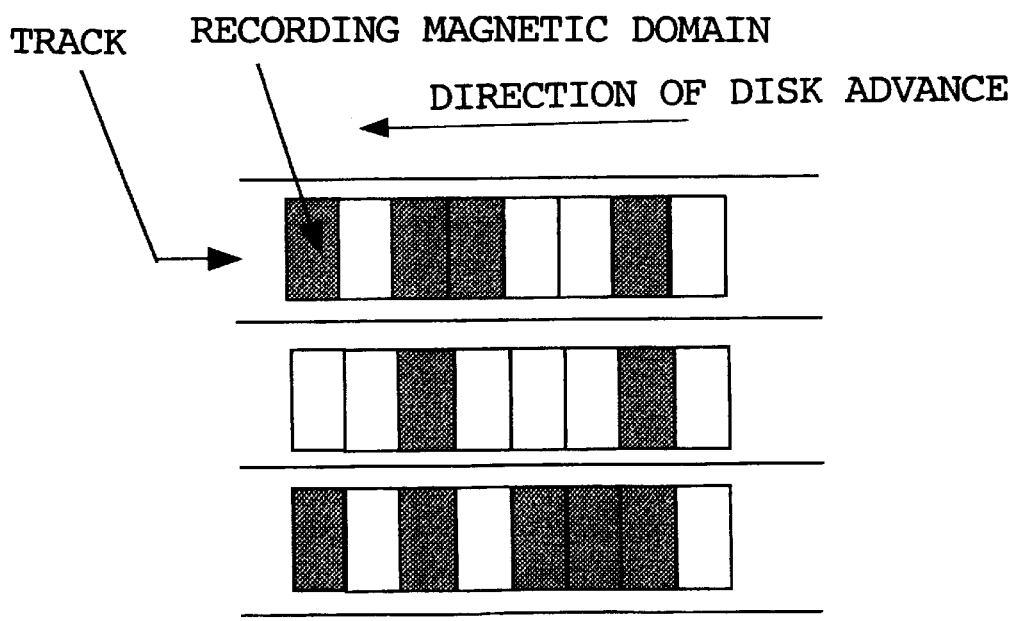
FIG. 28B is a diagram of a recording magnetic domain wherein recording is effected in a rectangular configuration using a magnetic field modulation system according to Embodiment 7.
Figure 29A:
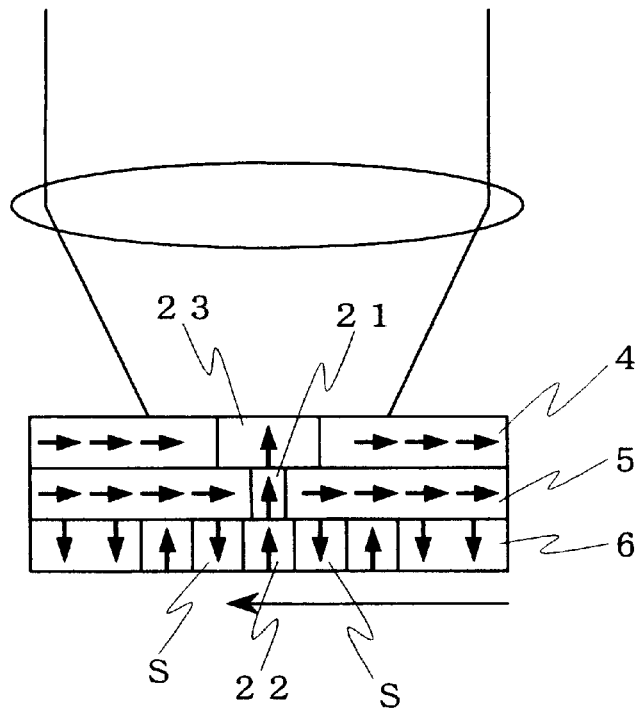
FIGS. 29A and B are views given in explanation of the principles of reproducing a magneto-optical recording medium according to the present invention which is moving in rotation relative to the reproducing light beam.
Figure 29B:
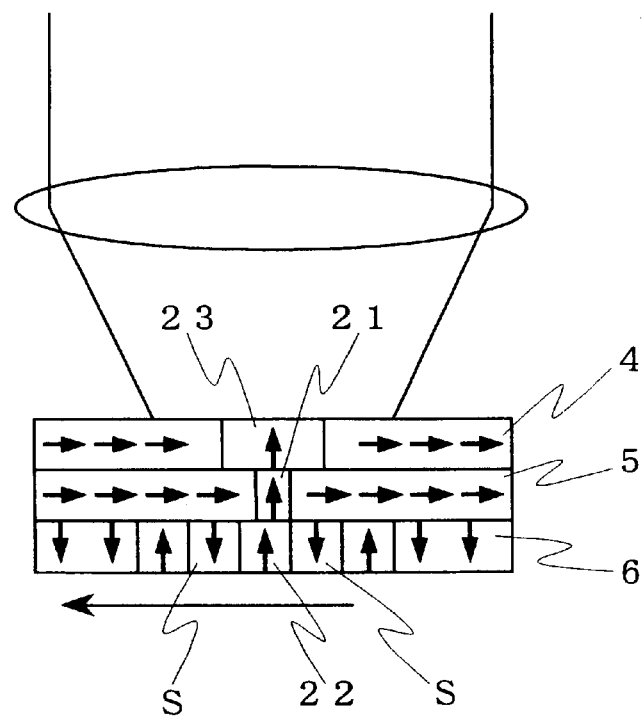

In the foregoing embodiments, recording a recording signal onto a magneto-optical recording medium was effected using the optical magnetic field modulation system; however, it would be possible to effect recording using the magnetic field modulation system. Whichever recording system is used, the recording magnetic domains should desirably be formed such that the configuration of the shortest recording magnetic domains (magnetic domains whose length in the linear direction is shortest) have length in the track width direction of the magnetic domain that is longer than their length in the linear direction (track direction). Even more preferably, a configuration in which the rear part of the magnetic domain is concave towards the inside of the magnetic domain is desirable. As examples of such a shortest magnetic domain, the crescent-shaped magnetic domain shown in FIG. 28A or rectangular magnetic domain shown in FIG. 28B are ideal. Apart from this, the shortest magnetic domains may desirably have an arrow (arrow wing) configuration with the arrow tips directed in the direction of disk rotation and the opposite direction. In order to record a magnetic domain such that the length of the magnetic domain in the track width direction is longer than its length in the linear direction, it is effective to employ the magnetic field modulation recording system. Adjustment of the configuration of magnetic domains such as arrow-shaped magnetic domains can be achieved by changing the configuration of the substrate grooves and/or lands.

Such a recording magnetic domain configuration facilitates magnification of magnetic domains that are transferred from the reproducing layer for the following reasons. Let us assume that for example a crescent-shaped magnetic domain as shown in FIG. 28A is recorded in a recording layer of magneto-optical recording medium according to the present invention. On reproduction of the magneto-optical recording medium, heating of the magneto-optical recording medium by the reproducing light beam causes a crescent-shaped magnetic domain to be transferred to the reproducing layer by magnetostatic coupling or by exchange coupling. In the reproducing layer, the portion corresponding to the centre of the reproducing light beam (or to the rear of this) reaches high temperature. Since the magnetic wall between magnetic domains is thermodynamically more stable at higher temperature, the concave portion of the crescent-shaped magnetic domain becomes more stable going towards the higher-temperature portion (central part of the circle having common circular arc with the crescent). Also, the magnetic wall is more stable when its length is short, so a magnetic domain in which the concave part of the crescent-shaped magnetic domain has been magnified into a semicircular configuration is more stable since the magnetic wall is then shorter. Consequently, the magnetic domains can be easily magnified in accordance with such a temperature distribution and magnetic domain configuration in the reproducing layer. A crescent shape or similar is also desirable for the following reasons. Taking into account magnetic field leakage from the recording magnetic domain into the reproducing layer, the magnetic field leakage from a recording magnetic domain of crescent shape is a maximum at the centre of the crescent (central part of the circle having common circular arc with the crescent) in the reproducing layer above a crescent-shaped magnetic domain. For this reason, the magnetic domain transferred to the reproducing layer can easily be magnified by this magnetic field leakage.

A specific description has been given of the present invention using embodiments, but the present invention is not particularly restricted to these. For example, as the materials constituting the magneto-optical recording medium various materials can be employed so long as they have the action of the present invention, and any desired intermediate layers may be provided in any desired locations before or after the auxiliary magnetic layers or before or after the magneto-optical recording layer. Also, although recording of the information in Embodiments 2 and 3 was effected using the optical magnetic field recording system, there is no restriction to this and the optical modulation system or magnetic field modulation system could be employed. The present invention is effective in magneto-optical recording media of the land-groove type in which the width of the lands is smaller than the width of the grooves. That is, reproduction with high C/N can be achieved even though minute magnetic domains are recorded in lands of narrow width, owing to the magnification of the magnetic domains transferred into the reproducing layer which is made possible with the present invention.

INDUSTRIAL APPLICABILITY

In a magneto-optical recording medium according to the present invention, the thickness of the first auxiliary magnetic layer is adjusted to a thickness exceeding the thickness of the magnetic wall or exceeding 10 nm, so magnetic domain transfer to the second auxiliary magnetic layer from the magneto-optical recording layer and magnification and reproduction of magnetic domains by a reproducing magnetic field can be performed in reliable fashion. Also, with the magneto-optical recording medium of the present invention, since the size of the magnetic domains transferred to the first auxiliary magnetic layer is adjusted so as to be smaller than the size of recording magnetic domains of the magneto-optical recording layer, magnification of the magnetic domains transferred to the second auxiliary magnetic layer is promoted. Consequently, the magneto-optical recording medium of the present invention can provide a super-high density recording medium.

In the method of magneto-optical recording and reproduction of the present invention, in a magneto-optical recording medium according to the present invention, by applying a reproducing magnetic field and/or reproducing light beam pulse-modulated in accordance with a reproducing clock, a plurality of minute magnetic domains present in the reproduction spot can be reproduced independently and with high S/N and low error rate. A magneto-optical recording and reproducing apparatus according to the present invention is an apparatus which is very effective in the magneto-optical recording and reproducing method of the present invention whereby a modulated reproducing magnetic field and/or reproducing light beam is applied to a magneto-optical recording medium.

What is claimed is:

1. A magneto-optical medium comprising at least a magneto-optical recording layer on which information is recorded; a first auxiliary magnetic layer; and a second auxiliary magnetic layer wherein, when irradiated with a reproducing light beam, a recording magnetic domain recorded in the magneto-optical recording layer is magnified and transferred to the second auxiliary magnetic layer through the first auxiliary magnetic layer and information is reproduced from the magnetic domain of the second auxiliary magnetic layer which has thus been magnified and transferred, characterized in that:

the thickness of the first auxiliary magnetic layer is not less than the thickness of a magnetic wall of the first auxiliary magnetic layer, wherein the radius of the magnetic domain transferred to the first auxiliary magnetic layer is smaller than the radius of the recording magnetic domain of the magneto-optical recording layer and the radius of the magnetic domain transferred to the second auxiliary magnetic layer is larger than the radius of the recording magnetic domain of the magneto-optical recording layer, and if the Curie temperatures of the magneto-optical recording layer, the first auxiliary magnetic layer and the second auxiliary magnetic layer are respectively $T_{C0}$, $T_{C1}$ and $T_{C2}$, and the critical temperatures ($T_{CR}$) of the first auxiliary magnetic layer and the second auxiliary magnetic layer are respectively $T_{CR1}$ and $T_{CR2}$, room temperature$<T_{CR2}<T_{CR1}<T_{C0}$, $T_{C1}$, $T_{C2}$.

2. The magneto-optical recording medium according to claim 1, further comprising a reproducing magnetic layer on the second auxiliary magnetic layer whose Kerr rotation angle θK at the maximum temperature attained by the magneto-optical recording medium when irradiated by a reproducing light beam is above the θK of the first and second auxiliary magnetic layers and which is a perpendicularly magnetizable film above room temperature.

3. The magneto-optical recording medium according to claim 1, wherein the shortest recording magnetic domain which is recorded in the magneto-optical recording layer is longer in the track width direction than in the linear direction.

4. The magneto-optical recording medium according to claim 3, wherein the configuration of the shortest recording magnetic domain is one configuration selected from the group consisting of crescent-shaped, arrow-shaped and elongate.

5. A magneto-optical recording medium comprising: at least a magneto-optical recording layer on which information is recorded; a first auxiliary magnetic layer; and a second auxiliary magnetic layer wherein, when irradiated with a reproducing light beam, a recording magnetic domain recorded in the magneto-optical recording layer is magnified and transferred to the second auxiliary magnetic layer through the first auxiliary magnetic layer and information is reproduced from this magnetic domain of the second auxiliary magnetic layer which has thus been magnified and transferred, characterized in that:

the thickness of the first auxiliary magnetic layer exceeds 10 nm, wherein the first and second auxiliary magnetic layers are magnetic layers which are in-plane magnetizable films from room temperature to the critical temperature and perpendicularly magnetizable films above the critical temperature, and if the Curie temperatures of the magneto-optical recording layer, the first auxiliary magnetic layer and the second auxiliary magnetic layer are respectively $T_{C0}$, $T_{C1}$ and $T_{C2}$, and the critical temperatures ($T_{CR}$) of the first auxiliary magnetic layer and the second auxiliary magnetic layer are respectively $T_{CR1}$ and $T_{CR2}$, room temperature$<T_{CR2}<T_{CR1}<T_{C0}$, $T_{C1}$, $T_{C2}$.

6. The magneto-optical recording medium according to claim 5, further comprising a reproducing magnetic layer on the second auxiliary magnetic layer whose Kerr rotation angle θK at the maximum temperature attained by the magneto-optical recording medium when irradiated by a reproducing light beam is above the θK of the first and second auxiliary magnetic layers and which is a perpendicularly magnetizable film above room temperature.

7. The magneto-optical recording medium according to claim 5, wherein the shortest recording magnetic domain which is recorded in the magneto-optical recording layer is longer in the track width direction than in the linear direction.

8. The magneto-optical recording medium according to claim 7, wherein the configuration of the shortest recording magnetic domain is one configuration selected from the group consisting of crescent-shaped, arrow-shaped and elongate.

9. A method of reproducing a magneto-optical recording medium in which a recorded signal is reproduced by irradiating a magneto-optical recording medium having a magneto-optical recording layer with a reproducing light beam and detecting the magnitude of the magneto-optical effect, characterized in that:

the magneto-optical recording medium comprises:

at least a magneto-optical recording layer on which information is recorded;

a first auxiliary magnetic layer; and a second auxiliary magnetic layer wherein, when irradiated with a reproducing light beam, a recording magnetic domain recorded in the magneto-optical recording layer is magnified and transferred to the second auxiliary magnetic layer through the first auxiliary magnetic layer and information is reproduced from the magnetic domain of the second auxiliary magnetic layer which has thus been magnified and transferred, wherein:

(a) the thickness of the first auxiliary magnetic layer is not less than the thickness of the magnetic wall of the first auxiliary magnetic layer, or (b) the thickness of the first auxiliary magnetic layer exceeds 10 nm; and the recording signal is reproduced by irradiating the magneto-optical recording medium with a reproducing light beam, which is pulse-modulated in accordance with a reproducing clock so as to prevent inversion of magnetization in a portion of the second auxiliary magnetic layer in which no transferred magnetic domain is present, and in which the first and second auxiliary magnetic layers of the magneto-optical recording medium are in-plane magnetizable films from room temperature up to the critical temperature and are perpendicularly magnetizable films above the critical temperature, wherein if the Curie temperatures of the magneto-optical recording layer, the first auxiliary magnetic layer and the second auxiliary magnetic layer are respectively $T_{C0}$, $T_{C1}$ and $T_{C2}$, and the critical temperatures ($T_{CR}$) of the first auxiliary magnetic layer and the second auxiliary magnetic layer are respectively $T_{CR1}$ and $T_{CR2}$, room temperature$<T_{CR2}<T_{CR1}<T_{C0}$, $T_{C1}$, $T_{C2}$.

10. The method of reproducing a magneto-optical recording medium according to claim 9, wherein the reproducing light beam power and $T_{CR1}$ and $T_{CR2}$ of the magneto-optical recording medium are adjusted such that the radius of a magnetic domain transferred into the first auxiliary magnetic layer is smaller than the radius of a recording magnetic domain of the magneto-optical recording layer and the radius of a magnetic domain transferred into the second auxiliary magnetic layer is larger than the radius of a recording magnetic domain of the magneto-optical recording layer.

11. A method of reproducing a magneto-optical recording medium wherein a recording signal is reproduced by irradiating a magneto-optical recording medium having a magneto-optical recording layer with a reproducing light beam and detecting the magnitude of the magneto-optical effect, characterized in that:

the magneto-optical recording medium comprises:

at least a magneto-optical recording layer on which information is recorded;

a first auxiliary magnetic layer; and a second auxiliary magnetic layer wherein, when irradiated with a reproducing light beam, a recording magnetic domain recorded in the magneto-optical recording layer is magnified and transferred to the second auxiliary magnetic layer through the first auxiliary magnetic layer and information is reproduced from the magnetic domain of the second auxiliary magnetic layer which has thus been magnified and transferred, wherein:

(a) the thickness of the first auxiliary magnetic layer is not less than the thickness of the magnetic wall of the first auxiliary magnetic layer, or (b) the thickness of the first auxiliary magnetic layer exceeds 10 nm; and the recording signal is reproduced by applying to the magneto-optical recording medium an external magnetic field which is pulse-modulated in accordance with a reproducing clock, and the first and second auxiliary magnetic layers of the magneto-optical recording medium are in-plane magnetizable films from room temperature up to the critical temperature and are perpendicularly magnetizable films above the critical temperature, wherein if the Curie temperatures of the magneto-optical recording layer, the first auxiliary magnetic layer and the second auxiliary magnetic layer are respectively $T_{C0}$, $T_{C1}$ and $T_{C2}$, and the critical temperatures ($T_{CR}$) of the first auxiliary magnetic layer and the second auxiliary magnetic layer are respectively $T_{CR1}$ and $T_{CR2}$, room temperature$<T_{CR2}<T_{CR1}<T_{C0}$, $T_{C1}$, $T_{C2}$.

12. The method of reproducing a magneto-optical recording medium according to claim 11, wherein the reproducing light beam power and $T_{CR1}$ and $T_{CR2}$ of the magneto-optical recording medium are adjusted such that the radius of a magnetic domain transferred into the first auxiliary magnetic layer is smaller than the radius of a recording magnetic domain of the magneto-optical recording layer and the radius of a magnetic domain transferred into the second auxiliary magnetic layer is larger than the radius of a recording magnetic domain of the magneto-optical recording layer.

13. A reproducing apparatus for magneto-optical recording media for performing a reproducing method, comprising:

a magnetic head that applies a reproducing magnetic field to the magneto-optical recording media;

an optical head that irradiates the magneto-optical recording media with a reproducing light beam;

a clock generating unit for generating a reproducing clock;

a control unit for controlling at least one of the magnetic head and optical head in accordance with the reproducing clock in order to pulse-modulate at least one of the reproducing magnetic field and the reproducing light beam; and a magnetic head drive unit and a second synchronisation signal generating unit that generates a second synchronisation signal for pulse modulating the reproducing magnetic field in accordance with the reproducing clock, the magnetic head drive unit being controlled by the second synchronisation signal, wherein said reproducing method comprises:

reproducing a recording signal by irradiating the magneto-optical recording media having a magneto-optical recording layer with a reproducing light beam and detecting the magnitude of the magneto-optical effect, and, the recording signal is reproduced by applying to the magneto-optical recording media an external magnetic field which is pulse modulated with a reproducing clock, characterized in that:

the magneto-optical recording media comprises at least a magneto-optical recording layer on which information is recorded;

a first auxiliary magnetic layer; and a second auxiliary magnetic layer wherein, when irradiated with a reproducing light beam, a recording magnetic domain recorded in the magneto-optical recording layer is magnified and transferred to the second auxiliary magnetic layer through the first auxiliary magnetic layer and information is reproduced from the magnetic domain of the second auxiliary magnetic layer which has thus been magnified and transferred, wherein:

(a) the thickness of the first auxiliary magnetic layer is not less than the thickness of the magnetic wall of the first auxiliary magnetic layer, or (b) the thickness of the first auxiliary magnetic layer exceeds 10 nm.

14. The reproducing apparatus for magneto-optical recording media according to claim 13, wherein the second synchronisation signal generating circuit controls the pulse period, pulse width and phase of the reproducing magnetic field.

15. The reproducing apparatus for magneto-optical recording media according to claim 14, wherein the reproducing apparatus has a function of recording information on the magneto-optical recording medium and further comprising a control circuit for switching and controlling the pulse period, pulse width and phase of the recording magnetic field and the pulse period, pulse width and phase of the reproducing magnetic field respectively.

16. A reproducing apparatus for magneto-optical recording media for performing a reproducing method, comprising:

a magnetic head that applies a reproducing magnetic field to the magneto-optical recording media;

an optical head that irradiates the magneto-optical recording media with a reproducing light beam;

a clock generating unit for generating a reproducing clock;

a control unit for controlling at least one of the magnetic head and optical head in accordance with the reproducing clock in order to pulse-modulate at least one of the reproducing magnetic field and the reproducing light beam; and an optical head drive unit; a first synchronisation signal generating circuit for generating a first synchronisation signal for pulse-modulating the reproducing light beam in accordance with the reproducing clock; a magnetic head drive unit; and a second synchronisation signal generating circuit for generating a second synchronisation signal for pulse-modulating the reproducing magnetic field in accordance with the reproducing clock; the magneto-optical recording media being irradiated by the reproducing light beam which is pulse-modulated by the optical head drive unit being controlled by the first synchronisation signal and a magnetic field that is pulse-modulated by the magnetic head drive unit being controlled by the second synchronisation signal being applied to the magneto-optical recording media, wherein said reproducing method comprises:

reproducing a recording signal by irradiating a magneto-optical recording media having a magneto-optical recording layer with a reproducing light beam and detecting the magnitude of the magneto-optical effect, and, the recording signal is reproduced by applying to the magneto-optical recording medium an external magnetic field which is pulse modulated in accordance with a reproducing clock, characterized in that:

the magneto-optical recording media comprises at least a magneto-optical recording layer on which information is recorded;

a first auxiliary magnetic layer; and a second auxiliary magnetic layer wherein, when irradiated with a reproducing light beam, a recording magnetic domain recorded in the magneto-optical recording layer is magnified and transferred to the second auxiliary magnetic layer through the first auxiliary magnetic layer and information is reproduced from the magnetic domain of the second auxiliary magnetic layer which has thus been magnified and transferred, wherein:

(a) the thickness of the first auxiliary magnetic layer is not less than the thickness of the magnetic wall of the first auxiliary magnetic layer, or (b) the thickness of the first auxiliary magnetic layer exceeds 10 nm.

17. The reproducing apparatus for magneto-optical recording media according to claim 16, wherein the first synchronisation signal generating circuit controls the pulse period, pulse width and phase of the reproducing light beam.

18. The reproducing apparatus for magneto-optical recording media according to claim 17, wherein the reproducing apparatus has a function of recording information on the magneto-optical recording medium and further comprising a control circuit for switching and controlling the pulse period, pulse width and phase of the recording light beam and the pulse period, pulse width and phase of the reproducing light beam respectively.

19. The reproducing apparatus for magneto-optical recording media according to claim 13, wherein the reproducing clock is generated from a signal detected by the optical head.

20. The reproducing apparatus for magneto-optical recording media according to claim 13, wherein the reproducing clock is generated based on a signal detected from one selected from the group consisting of pits formed in the magneto-optical recording media, fine clock marks and a wobble-shaped groove.

21. The reproducing apparatus for magneto-optical recording media according to claim 13, wherein the reproducing clock is generated from a signal detected by the optical head and has a period exceeding one period per unit bit.

22. The reproducing apparatus for magneto-optical recording media according to claim 13, wherein the duty ratio of the pulse-modulated magnetic field is in the range 0.15–0.9.

23. The reproducing apparatus for magneto-optical recording media according to claim 22, wherein the duty ratio of the pulse-modulated magnetic field is in the range 0.15~0.6.

24. The reproducing apparatus for magneto-optical recording media according to claim 16, wherein the frequency of the pulse-modulated reproducing light beam is twice the frequency of the pulse-modulated reproducing magnetic field.

25. The reproducing apparatus for magneto-optical recording media according to claim 13, wherein the optical head and the magnetic head are mounted on the same side of the magneto-optical recording media.

26. The reproducing apparatus for magneto-optical recording media according to claim 25, wherein the magnetic head and optical head are integrated by winding a magnetic coil onto the periphery of an object lens which is a component of the optical head.

27. The reproducing apparatus for magneto-optical recording media according to claim 13, wherein a magnetic field waveform that has substantially no overshoot is generated from the magnetic head.

28. The reproducing apparatus for magneto-optical recording media according to claim 27, wherein the control circuit is a circuit for generating from the magnetic head a pulsed magnetic field waveform in which magnetic field intensity increases gradually.

29. The reproducing apparatus for magneto-optical recording media according to claim 28, wherein the pulsed magnetic field waveform is a triangular wave or sine wave.

30. The magneto-optical recording medium according to claim 1, wherein the first and second auxiliary magnetic layers are magnetic layers which are in-plane magnetizable films from room temperature to the critical temperature and perpendicularly magnetizable films above the critical temperature.

31. The magneto-optical recording medium according to claim 5, wherein the thickness t of the first auxiliary magnetic layer is 10 nm<t<100 nm.

32. The magneto-optical recording medium according to claim 5, wherein the radius of the magnetic domain transferred to the first auxiliary magnetic layer is smaller than the radius of the recording magnetic domain of the magneto-optical recording layer and the radius of the magnetic domain transferred to the second auxiliary magnetic layer is larger than the radius of the recording magnetic domain of the magneto-optical recording layer.

33. The method of reproducing a magneto-optical recording medium according to claim 9, wherein the pulse-modulated reproducing light beam has at least two different powers.

34. The method of reproducing a magneto-optical recording medium according to claim 11, wherein a recording signal is reproduced while irradiating the magneto-optical recording medium with a reproducing light beam which is pulse-modulated in accordance with a reproducing clock.

35. The method of reproducing a magneto-optical recording medium according to claim 34, wherein the pulse-modulated reproducing light beam has at least two different powers.

36. The reproducing apparatus for magneto-optical recording media according to claim 16, wherein the reproducing clock is generated from a signal detected by the optical head.

37. The reproducing apparatus for magneto-optical recording media according to claim 16, wherein the reproducing clock is generated based on a signal detected from one selected from the group consisting of pits formed in the magneto-optical recording media, fine clock marks and a wobble-shaped groove.

38. The reproducing apparatus for magneto-optical recording media according to claim 16, wherein the reproducing clock is generated from a signal detected by the optical head and has a period exceeding one period per unit bit.

39. The reproducing apparatus for magneto-optical recording media according to claim 16, wherein the duty ratio of the pulse-modulated magnetic field is in the range 0.15–0.9.

40. The reproducing apparatus for magneto-optical recording media according to claim 39, wherein the duty ratio of the pulse-modulated magnetic field is in the range 0.15–0.6.

41. The reproducing apparatus for magneto-optical recording media according to claim 16, wherein the optical head and the magnetic head are mounted on the same side of the magneto-optical recording media.

42. The reproducing apparatus for magneto-optical recording media according to claim 41, wherein the magnetic head and optical head are integrated by winding a magnetic coil onto the periphery of an object lens which is a component of the optical head.

43. The reproducing apparatus for magneto-optical recording media according to claim 16, wherein a magnetic field waveform that has substantially no overshoot is generated from the magnetic head.

44. The reproducing apparatus for magneto-optical recording media according to claim 43, wherein the control circuit is a circuit for generating from the magnetic head a pulsed magnetic field waveform in which magnetic field intensity increases gradually.

45. The reproducing apparatus for magneto-optical recording media according to claim 44, wherein the pulsed magnetic field waveform is a triangular wave or sine wave.

* * * * *